US011269977B2

(12) United States Patent
Turgeman et al.

(10) Patent No.: US 11,269,977 B2
(45) Date of Patent: Mar. 8, 2022

(54) SYSTEM, APPARATUS, AND METHOD OF COLLECTING AND PROCESSING DATA IN ELECTRONIC DEVICES

(71) Applicant: BioCatch Ltd., Tel Aviv (IL)

(72) Inventors: Avi Turgeman, Cambridge, MA (US);
Yehuda Sabag, Tzur Hadassa (IL);
Leonid Karabchevsky, Shimshit (IL)

(73) Assignee: BIOCATCH LTD., Tel Aviv (IL)

( * ) Notice: Subject to any disclaimer, the term of this patent is extended or adjusted under 35 U.S.C. 154(b) by 352 days.

(21) Appl. No.: 16/571,119

(22) Filed: Sep. 15, 2019

(65) Prior Publication Data

US 2020/0012770 A1 Jan. 9, 2020

Related U.S. Application Data

(63) Continuation-in-part of application No. 15/847,946, filed on Dec. 20, 2017, now Pat. No. 10,728,761, and
(Continued)

(51) Int. Cl.
*G06F 21/00* (2013.01)
*G06F 21/31* (2013.01)
(Continued)

(52) U.S. Cl.
CPC ........ *G06F 21/316* (2013.01); *G06F 21/6245* (2013.01); *G06Q 20/3224* (2013.01);
(Continued)

(58) Field of Classification Search
CPC combination set(s) only.
See application file for complete search history.

(56) References Cited

U.S. PATENT DOCUMENTS 3,618,019 A 11/1971 Nemirovsky
3,699,517 A 10/1972 Dyche
(Continued)

FOREIGN PATENT DOCUMENTS

EP 2410450 A1 1/2012
EP 2477136 A1 7/2012
(Continued)

OTHER PUBLICATIONS

International Search Report for PCT international application PCT/IL2018/051246, dated Mar. 11, 2019.
(Continued)

*Primary Examiner* — Tri M Tran
(74) *Attorney, Agent, or Firm* — Eitan Mehulal Sadot

(57) ABSTRACT

System and method of collecting and processing data in electronic devices. A sensors data collector collects measurements from at least an accelerometer and a gyroscope of an electronic device. A data-loss prevention module operates to pass these measurements, immediately upon their collection, to a supplemental locally-running processing thread which retains the measurements even after a refresh of a web-page in which the measurements were collected, and which transmits the measurements to a remote server even after refresh of the web-page in which the measurements were collected. Non-global scope of functions is utilized, to reduce security exposure. An asynchronous SharedWorker module is utilized, to alleviate congestion of computing resources of the electronic device. Data obfuscation and encoding is utilized to maintain anonymity of user-entered data while still allowing a remote server to ensure the integrity of data received from the electronic device.

18 Claims, 3 Drawing Sheets

Related U.S. Application Data a continuation of application No. 15/691,770, filed on Aug. 31, 2017, now abandoned, said application No. 15/847,946 is a continuation-in-part of application No. 14/675,764, filed on Apr. 1, 2015, now abandoned, which is a continuation-in-part of application No. 14/566,723, filed on Dec. 11, 2014, now Pat. No. 9,071,969, and a continuation-in-part of application No. 14/325,396, filed on Jul. 8, 2014, now abandoned, and a continuation-in-part of application No. 14/325,395, filed on Jul. 8, 2014, now Pat. No. 9,621,567, and a continuation-in-part of application No. 14/325,393, filed on Jul. 8, 2014, now Pat. No. 9,531,733, and a continuation-in-part of application No. 14/325,397, filed on Jul. 8, 2014, now Pat. No. 9,450,971, and a continuation-in-part of application No. 14/325,394, filed on Jul. 8, 2014, now Pat. No. 9,547,766, and a continuation-in-part of application No. 14/325,398, filed on Jul. 8, 2014, now Pat. No. 9,477,826, and a continuation-in-part of application No. 14/320,653, filed on Jul. 1, 2014, now Pat. No. 9,275,337, and a continuation-in-part of application No. 14/320,656, filed on Jul. 1, 2014, now Pat. No. 9,665,703, said application No. 14/566,723 is a continuation of application No. 13/922,271, filed on Jun. 20, 2013, now Pat. No. 8,938,787, which is a continuation-in-part of application No. 13/877,676, filed as application No. PCT/IL2011/000907 on Nov. 29, 2011, now Pat. No. 9,069,942.

(60) Provisional application No. 62/546,353, filed on Aug. 16, 2017, provisional application No. 61/973,855, filed on Apr. 2, 2014, provisional application No. 61/843,915, filed on Jul. 9, 2013, provisional application No. 61/417,479, filed on Nov. 29, 2010.

(51) Int. Cl.
*G06Q 20/40* (2012.01)
*G06F 21/62* (2013.01)
*G06Q 20/32* (2012.01)
*G06Q 40/02* (2012.01)

(52) U.S. Cl.
CPC ... *G06Q 20/4016* (2013.01); *G06Q 20/40145* (2013.01); *G06Q 40/02* (2013.01)

(56) References Cited

U.S. PATENT DOCUMENTS

| | | | |
|---|---|---|---|
| 3,983,535 A | 9/1976 | Herbst |
| 4,128,829 A | 12/1978 | Herbst |
| 4,621,334 A | 11/1986 | Garcia |
| 4,760,386 A | 7/1988 | Heath |
| 4,805,222 A | 2/1989 | Young |
| 5,305,238 A | 4/1994 | Starr |
| 5,442,342 A | 8/1995 | Kung |
| 5,485,171 A | 1/1996 | Copper |
| 5,557,686 A | 9/1996 | Brown |
| 5,565,657 A | 10/1996 | Merz |
| 5,581,261 A | 12/1996 | Hickman |
| 5,838,306 A | 11/1998 | O'Connor |
| 5,874,941 A | 2/1999 | Kamada |
| 5,999,162 A | 12/1999 | Takahashi |
| 6,202,023 B1 | 3/2001 | Hancock |
| 6,337,686 B2 | 1/2002 | Wong |
| 6,337,919 B1 | 1/2002 | Dunton |
| 6,442,692 B1 | 8/2002 | Zilberman |
| 6,572,014 B1 | 6/2003 | Lambert |
| 6,819,219 B1 | 11/2004 | Bolle |
| 6,836,554 B1 | 12/2004 | Bolle |
| 6,895,514 B1 | 5/2005 | Kermani |
| 6,931,131 B1 | 8/2005 | Becker |
| 6,938,061 B1 | 8/2005 | Rumynin |
| 6,938,159 B1 | 8/2005 | O'Connor |
| 6,957,185 B1 | 10/2005 | Labaton |
| 6,957,186 B1 | 10/2005 | Guheen |
| 6,983,061 B2 | 1/2006 | Ikegami |
| 7,092,926 B2 | 8/2006 | Cerrato |
| 7,130,452 B2 | 10/2006 | Bolle |
| 7,133,792 B2 | 11/2006 | Murakami |
| 7,139,916 B2 | 11/2006 | Billingsley |
| 7,158,118 B2 | 1/2007 | Liberty |
| 7,236,156 B2 | 6/2007 | Liberty |
| 7,245,218 B2 | 7/2007 | Ikehara |
| 7,366,919 B1 | 4/2008 | Sobel |
| 7,395,436 B1 | 7/2008 | Nemovicher |
| 7,494,061 B2 | 2/2009 | Reinhold |
| 7,523,191 B1 | 4/2009 | Thomas |
| 7,535,456 B2 | 5/2009 | Liberty |
| 7,606,915 B1 | 10/2009 | Calinov |
| 7,796,013 B2 | 9/2010 | Murakami |
| 7,818,290 B2 | 10/2010 | Davis |
| 7,860,870 B2 | 12/2010 | Sadagopan |
| 8,031,175 B2 | 10/2011 | Rigazio |
| 8,065,624 B2 | 11/2011 | Morin |
| 8,125,312 B2 | 2/2012 | Orr |
| 8,156,324 B1 | 4/2012 | Shnowske |
| 8,201,222 B2 | 6/2012 | Inoue |
| 8,285,658 B2 | 10/2012 | Kellas-Dicks |
| 8,417,960 B2 | 4/2013 | Takahashi |
| 8,433,785 B2 | 4/2013 | Awadallah |
| 8,449,393 B2 | 5/2013 | Sobel |
| 8,499,245 B1 | 7/2013 | Froment |
| 8,510,113 B1 | 8/2013 | Conkie |
| 8,548,208 B2 | 10/2013 | Schultz |
| 8,549,629 B1 | 10/2013 | Mccreesh |
| 8,555,077 B2 | 10/2013 | Davis |
| 8,745,729 B2 | 6/2014 | Poluri |
| 8,788,838 B1 | 8/2014 | Fadell |
| 8,803,797 B2 | 8/2014 | Scott |
| 8,819,812 B1 | 8/2014 | Weber |
| 8,832,823 B2 | 9/2014 | Boss |
| 8,838,060 B2 | 9/2014 | Walley |
| 8,880,441 B1 | 11/2014 | Chen |
| 8,898,787 B2 | 11/2014 | Thompson |
| 8,938,787 B2 | 1/2015 | Turgeman |
| 8,941,466 B2 | 1/2015 | Bayram |
| 8,990,959 B2 | 3/2015 | Zhu |
| 9,069,942 B2 | 6/2015 | Turgeman |
| 9,071,969 B2 | 6/2015 | Turgeman |
| 9,154,534 B1 | 10/2015 | Gayles |
| 9,174,123 B2 | 11/2015 | Nasiri |
| 9,195,351 B1 | 11/2015 | Rosenberg |
| 9,275,337 B2 | 3/2016 | Turgeman |
| 9,282,112 B2 | 3/2016 | Filatov |
| 9,301,140 B1 | 3/2016 | Costigan |
| 9,304,915 B2 | 4/2016 | Adams |
| 9,418,221 B2 | 8/2016 | Turgeman |
| 9,450,971 B2 | 9/2016 | Turgeman |
| 9,477,826 B2 | 10/2016 | Turgeman |
| 9,483,292 B2 | 11/2016 | Turgeman |
| 9,526,006 B2 | 12/2016 | Turgeman |
| 9,529,987 B2 | 12/2016 | Deutschmann |
| 9,531,701 B2 | 12/2016 | Turgeman |
| 9,531,733 B2 | 12/2016 | Turgeman |
| 9,536,071 B2 | 1/2017 | Turgeman |
| 9,541,995 B2 | 1/2017 | Turgeman |
| 9,547,766 B2 | 1/2017 | Turgeman |
| 9,552,470 B2 | 1/2017 | Turgeman |
| 9,558,339 B2 | 1/2017 | Turgeman |
| 9,589,120 B2 | 3/2017 | Samuel |
| 9,621,567 B2 | 4/2017 | Turgeman |
| 9,626,677 B2 | 4/2017 | Turgeman |
| 9,654,485 B1 | 5/2017 | Neumann |
| 9,665,703 B2 | 5/2017 | Turgeman |
| 9,674,218 B2 | 6/2017 | Turgeman |
| 9,690,915 B2 | 6/2017 | Turgeman |
| 9,703,953 B2 | 7/2017 | Turgeman |

(56) References Cited

U.S. PATENT DOCUMENTS

| | | |
|---|---|---|
| 9,710,316 B1 | 7/2017 | Chheda |
| 9,712,558 B2 | 7/2017 | Turgeman |
| 9,747,436 B2 | 8/2017 | Turgeman |
| 9,779,423 B2 | 10/2017 | Turgeman |
| 9,838,373 B2 | 12/2017 | Turgeman |
| 9,848,009 B2 | 12/2017 | Turgeman |
| 9,927,883 B1 | 3/2018 | Lin |
| 10,032,010 B2 | 7/2018 | Turgeman |
| 10,037,421 B2 | 7/2018 | Turgeman |
| 10,049,209 B2 | 8/2018 | Turgeman |
| 10,055,560 B2 | 8/2018 | Turgeman |
| 10,069,837 B2 | 9/2018 | Turgeman |
| 10,069,852 B2 | 9/2018 | Turgeman |
| 10,079,853 B2 | 9/2018 | Turgeman |
| 10,083,439 B2 | 9/2018 | Turgeman |
| 10,164,985 B2 | 12/2018 | Turgeman |
| 10,198,122 B2 | 2/2019 | Turgeman |
| 10,262,324 B2 | 4/2019 | Turgeman |
| 10,298,614 B2 | 5/2019 | Turgeman |
| 10,395,018 B2 | 8/2019 | Turgeman |
| 10,397,262 B2 | 8/2019 | Karabchevsky |
| 10,404,729 B2 | 9/2019 | Turgeman |
| 2001/0004733 A1 | 6/2001 | Eldering |
| 2002/0023229 A1 | 2/2002 | Hangai |
| 2002/0089412 A1 | 7/2002 | Heger |
| 2003/0033526 A1 | 2/2003 | French |
| 2003/0074201 A1 | 4/2003 | Grashey |
| 2003/0137494 A1 | 7/2003 | Tulbert |
| 2003/0212811 A1 | 11/2003 | Thornton |
| 2004/0015714 A1 | 1/2004 | Abraham |
| 2004/0017355 A1 | 1/2004 | Shim |
| 2004/0021643 A1 | 2/2004 | Hoshino |
| 2004/0034784 A1 | 2/2004 | Fedronic |
| 2004/0062423 A1 | 4/2004 | Doi |
| 2004/0111523 A1 | 6/2004 | Hall |
| 2004/0123156 A1 | 6/2004 | Hammond |
| 2004/0143737 A1 | 7/2004 | Teicher |
| 2004/0186882 A1 | 9/2004 | Ting |
| 2004/0221171 A1 | 11/2004 | Ahmed |
| 2005/0008148 A1 | 1/2005 | Jacobson |
| 2005/0060138 A1 | 3/2005 | Wang |
| 2005/0179657 A1 | 8/2005 | Russo |
| 2005/0289264 A1 | 12/2005 | Illowsky |
| 2006/0006803 A1 | 1/2006 | Huang |
| 2006/0080263 A1 | 4/2006 | Willis |
| 2006/0090073 A1 | 4/2006 | Steinberg |
| 2006/0123101 A1 | 6/2006 | Buccella |
| 2006/0143454 A1 | 6/2006 | Walmsley |
| 2006/0195328 A1 | 8/2006 | Abraham |
| 2006/0215886 A1 | 9/2006 | Black |
| 2006/0224898 A1 | 10/2006 | Ahmed |
| 2006/0280339 A1 | 12/2006 | Cho |
| 2006/0282660 A1 | 12/2006 | Varghese |
| 2006/0284969 A1 | 12/2006 | Kim |
| 2007/0118804 A1 | 5/2007 | Raciborski |
| 2007/0156443 A1 | 7/2007 | Survey |
| 2007/0174082 A1 | 7/2007 | Singh |
| 2007/0183633 A1 | 8/2007 | Hoffmann |
| 2007/0214426 A1 | 9/2007 | Ruelle |
| 2007/0226797 A1 | 9/2007 | Thompson |
| 2007/0236330 A1 | 10/2007 | Cho |
| 2007/0240230 A1 | 10/2007 | O'Connell |
| 2007/0250920 A1 | 10/2007 | Lindsay |
| 2007/0255821 A1 | 11/2007 | Ge |
| 2007/0266305 A1 | 11/2007 | Cong |
| 2007/0271466 A1 | 11/2007 | Mak |
| 2007/0283416 A1 | 12/2007 | Renaud |
| 2008/0046982 A1 | 2/2008 | Parkinson |
| 2008/0059474 A1 | 3/2008 | Lim |
| 2008/0068343 A1 | 3/2008 | Hoshino |
| 2008/0084972 A1 | 4/2008 | Burke |
| 2008/0091639 A1 | 4/2008 | Davis |
| 2008/0092209 A1 | 4/2008 | Davis |
| 2008/0092245 A1 | 4/2008 | Alward |
| 2008/0097851 A1 | 4/2008 | Bemmel |
| 2008/0098456 A1 | 4/2008 | Alward |
| 2008/0120717 A1 | 5/2008 | Shakkarwar |
| 2008/0136790 A1 | 6/2008 | Hio |
| 2008/0162449 A1 | 7/2008 | Chao-Yu |
| 2008/0183745 A1 | 7/2008 | Cancel |
| 2008/0192005 A1 | 8/2008 | Elgoyhen |
| 2008/0200310 A1 | 8/2008 | Tagliabue |
| 2008/0211766 A1 | 9/2008 | Westerman |
| 2008/0215576 A1 | 9/2008 | Zhao |
| 2008/0263636 A1 | 10/2008 | Gusler |
| 2008/0298588 A1 | 12/2008 | Shakkarwar |
| 2008/0301808 A1 | 12/2008 | Calo |
| 2008/0306897 A1 | 12/2008 | Liu |
| 2009/0037983 A1 | 2/2009 | Chiruvolu |
| 2009/0038010 A1 | 2/2009 | Ma |
| 2009/0089879 A1 | 4/2009 | Wang |
| 2009/0094311 A1 | 4/2009 | Awadallah |
| 2009/0132395 A1 | 5/2009 | Lam |
| 2009/0157792 A1 | 6/2009 | Fiatal |
| 2009/0172551 A1 | 7/2009 | Kane |
| 2009/0189736 A1 | 7/2009 | Hayashi |
| 2009/0199296 A1 | 8/2009 | Xie |
| 2009/0227232 A1 | 9/2009 | Matas |
| 2009/0241188 A1 | 9/2009 | Komura |
| 2009/0254336 A1 | 10/2009 | Dumais |
| 2009/0281979 A1 | 11/2009 | Tysowski |
| 2009/0293119 A1 | 11/2009 | Jonsson |
| 2009/0320123 A1 | 12/2009 | Yu |
| 2010/0007632 A1 | 1/2010 | Yamazaki |
| 2010/0040293 A1 | 2/2010 | Hermann |
| 2010/0042387 A1 | 2/2010 | Gibbon |
| 2010/0042403 A1 | 2/2010 | Chandrasekar |
| 2010/0046806 A1 | 2/2010 | Baughman |
| 2010/0070405 A1 | 3/2010 | Joa |
| 2010/0077470 A1 | 3/2010 | Kozat |
| 2010/0082747 A1 | 4/2010 | Yue |
| 2010/0082998 A1 | 4/2010 | Kohavi |
| 2010/0115610 A1 | 5/2010 | Tredoux |
| 2010/0122082 A1 | 5/2010 | Deng |
| 2010/0125816 A1 | 5/2010 | Bezos |
| 2010/0138370 A1 | 6/2010 | Wu |
| 2010/0164897 A1 | 7/2010 | Morin |
| 2010/0171753 A1 | 7/2010 | Kwon |
| 2010/0197352 A1 | 8/2010 | Runstedler |
| 2010/0225443 A1 | 9/2010 | Bayram |
| 2010/0269165 A1 | 10/2010 | Chen |
| 2010/0281539 A1 | 11/2010 | Burns |
| 2010/0284532 A1 | 11/2010 | Burnett |
| 2010/0287229 A1 | 11/2010 | Hauser |
| 2010/0321304 A1 | 12/2010 | Rofougaran |
| 2010/0328074 A1 | 12/2010 | Johnson |
| 2011/0010209 A1 | 1/2011 | McNally |
| 2011/0012829 A1 | 1/2011 | Yao |
| 2011/0016320 A1 | 1/2011 | Bergsten |
| 2011/0016534 A1 | 1/2011 | Jakobsson |
| 2011/0018828 A1 | 1/2011 | Wu |
| 2011/0023115 A1 | 1/2011 | Wright |
| 2011/0029902 A1 | 2/2011 | Bailey |
| 2011/0039529 A1 | 2/2011 | Kim |
| 2011/0039602 A1 | 2/2011 | McNamara |
| 2011/0043475 A1 | 2/2011 | Rigazio |
| 2011/0050394 A1 | 3/2011 | Zhang |
| 2011/0063211 A1 | 3/2011 | Hoerl |
| 2011/0065504 A1 | 3/2011 | Dugan |
| 2011/0102570 A1 | 5/2011 | Wilf |
| 2011/0105859 A1 | 5/2011 | Popovic |
| 2011/0113388 A1 | 5/2011 | Eisen |
| 2011/0154273 A1 | 6/2011 | Aburada |
| 2011/0159650 A1 | 6/2011 | Shiraishi |
| 2011/0159850 A1 | 6/2011 | Faith |
| 2011/0162076 A1 | 6/2011 | Song |
| 2011/0191820 A1 | 8/2011 | Ivey |
| 2011/0193737 A1 | 8/2011 | Chiueh |
| 2011/0202453 A1 | 8/2011 | Issa |
| 2011/0221684 A1 | 9/2011 | Rydenhag |
| 2011/0223888 A1 | 9/2011 | Esaki |
| 2011/0225644 A1 | 9/2011 | Pullikottil |
| 2011/0246902 A1 | 10/2011 | Tsai |
| 2011/0248941 A1 | 10/2011 | Abdo |

(56) References Cited

U.S. PATENT DOCUMENTS

| | | |
|---|---|---|
| 2011/0251823 A1 | 10/2011 | Davis |
| 2011/0271342 A1 | 11/2011 | Chung |
| 2011/0276414 A1 | 11/2011 | Subbarao |
| 2011/0304531 A1 | 12/2011 | Brooks |
| 2011/0320822 A1 | 12/2011 | Lind |
| 2012/0005483 A1 | 1/2012 | Patvarczki |
| 2012/0005719 A1 | 1/2012 | McDougal |
| 2012/0007821 A1 | 1/2012 | Zaliva |
| 2012/0054834 A1 | 3/2012 | King |
| 2012/0096555 A1 | 4/2012 | Mahaffey |
| 2012/0102551 A1 | 4/2012 | Bidare |
| 2012/0113061 A1 | 5/2012 | Ikeda |
| 2012/0124662 A1 | 5/2012 | Baca |
| 2012/0133055 A1 | 5/2012 | Machida |
| 2012/0151559 A1 | 6/2012 | Koudys |
| 2012/0154173 A1 | 6/2012 | Chang |
| 2012/0154273 A1 | 6/2012 | McDade |
| 2012/0154823 A1 | 6/2012 | Sakamoto |
| 2012/0158503 A1 | 6/2012 | Mardikar |
| 2012/0159599 A1 | 6/2012 | Szoke |
| 2012/0164978 A1 | 6/2012 | Conti |
| 2012/0167170 A1 | 6/2012 | Shi |
| 2012/0167204 A1 | 6/2012 | Akka |
| 2012/0174213 A1 | 7/2012 | Geiger |
| 2012/0188198 A1 | 7/2012 | Jeong |
| 2012/0204257 A1 | 8/2012 | O'Connell |
| 2012/0218193 A1 | 8/2012 | Weber |
| 2012/0246737 A1 | 9/2012 | Paxton |
| 2012/0252410 A1 | 10/2012 | Williams |
| 2012/0278804 A1 | 11/2012 | Narayanasamy |
| 2012/0284380 A1 | 11/2012 | Anderson |
| 2013/0024239 A1 | 1/2013 | Baker |
| 2013/0036416 A1 | 2/2013 | Raju |
| 2013/0076650 A1 | 3/2013 | Vik |
| 2013/0088434 A1 | 4/2013 | Masuda |
| 2013/0097682 A1 | 4/2013 | Zeljkovic |
| 2013/0097706 A1 | 4/2013 | Titonis |
| 2013/0111586 A1 | 5/2013 | Jackson |
| 2013/0133055 A1 | 5/2013 | Ali |
| 2013/0135218 A1 | 5/2013 | Jain |
| 2013/0139248 A1 | 5/2013 | Rhee |
| 2013/0154999 A1 | 6/2013 | Guard |
| 2013/0162603 A1 | 6/2013 | Peng |
| 2013/0167212 A1 | 6/2013 | Azar |
| 2013/0212674 A1 | 8/2013 | Boger |
| 2013/0239195 A1 | 9/2013 | Turgeman |
| 2013/0239206 A1 | 9/2013 | Draluk |
| 2013/0282637 A1 | 10/2013 | Costigan |
| 2013/0288647 A1 | 10/2013 | Turgeman |
| 2013/0305357 A1 | 11/2013 | Ayyagari |
| 2013/0312097 A1 | 11/2013 | Turnbull |
| 2013/0335349 A1 | 12/2013 | Ferren |
| 2014/0033317 A1 | 1/2014 | Barber |
| 2014/0041020 A1 | 2/2014 | Zhao |
| 2014/0078061 A1 | 3/2014 | Simons |
| 2014/0078193 A1 | 3/2014 | Barnhoefer |
| 2014/0082369 A1 | 3/2014 | Waclawsky |
| 2014/0111451 A1 | 4/2014 | Park |
| 2014/0118520 A1 | 5/2014 | Slaby |
| 2014/0143304 A1 | 5/2014 | Hegarty |
| 2014/0168093 A1 | 6/2014 | Lawrence |
| 2014/0196119 A1 | 7/2014 | Hill |
| 2014/0200953 A1 | 7/2014 | Mun |
| 2014/0250538 A1 | 9/2014 | Rapaport |
| 2014/0259130 A1 | 9/2014 | Li |
| 2014/0270571 A1 | 9/2014 | Dwan |
| 2014/0283059 A1 | 9/2014 | Sambamurthy |
| 2014/0317028 A1 | 10/2014 | Turgeman |
| 2014/0317726 A1 | 10/2014 | Turgeman |
| 2014/0317734 A1 | 10/2014 | Valencia |
| 2014/0317744 A1 | 10/2014 | Turgeman |
| 2014/0325223 A1 | 10/2014 | Turgeman |
| 2014/0325645 A1 | 10/2014 | Turgeman |
| 2014/0325646 A1 | 10/2014 | Turgeman |
| 2014/0325682 A1 | 10/2014 | Turgeman |
| 2014/0337786 A1 | 11/2014 | Luo |
| 2014/0344927 A1 | 11/2014 | Turgeman |
| 2015/0002479 A1 | 1/2015 | Kawamura |
| 2015/0012920 A1 | 1/2015 | De Santis |
| 2015/0062078 A1 | 3/2015 | Christman |
| 2015/0091858 A1 | 4/2015 | Rosenberg |
| 2015/0094030 A1 | 4/2015 | Turgeman |
| 2015/0101031 A1 | 4/2015 | Harjanto |
| 2015/0146945 A1 | 5/2015 | Han |
| 2015/0205944 A1 | 7/2015 | Turgeman |
| 2015/0205955 A1 | 7/2015 | Turgeman |
| 2015/0205957 A1 | 7/2015 | Turgeman |
| 2015/0205958 A1 | 7/2015 | Turgeman |
| 2015/0212843 A1 | 7/2015 | Turgeman |
| 2015/0213244 A1 | 7/2015 | Lymberopoulos |
| 2015/0213246 A1 | 7/2015 | Turgeman |
| 2015/0213251 A1 | 7/2015 | Turgeman |
| 2015/0256528 A1 | 9/2015 | Turgeman |
| 2015/0256556 A1 | 9/2015 | Kaminsky |
| 2015/0264572 A1 | 9/2015 | Turgeman |
| 2015/0268768 A1 | 9/2015 | Woodhull |
| 2015/0310196 A1 | 10/2015 | Turgeman |
| 2016/0006800 A1 | 1/2016 | Summers |
| 2016/0012465 A1 | 1/2016 | Sharp |
| 2016/0034673 A1 | 2/2016 | Chandra |
| 2016/0042164 A1 | 2/2016 | Goldsmith |
| 2016/0077620 A1 | 3/2016 | Choi |
| 2016/0109969 A1 | 4/2016 | Keating |
| 2016/0132105 A1 | 5/2016 | Turgeman |
| 2016/0164905 A1 | 6/2016 | Pinney Wood |
| 2016/0164906 A1 | 6/2016 | Pinney Wood |
| 2016/0174044 A1 | 6/2016 | Jones |
| 2016/0179245 A1 | 6/2016 | Johansson |
| 2016/0191237 A1 | 6/2016 | Roth |
| 2016/0196414 A1 | 7/2016 | Stuntebeck |
| 2016/0197918 A1 | 7/2016 | Turgeman |
| 2016/0209948 A1 | 7/2016 | Tulber |
| 2016/0226865 A1 | 8/2016 | Chen |
| 2016/0294837 A1 | 10/2016 | Turgeman |
| 2016/0300054 A1 | 10/2016 | Turgeman |
| 2016/0306974 A1 | 10/2016 | Turgeman |
| 2016/0307191 A1 | 10/2016 | Turgeman |
| 2016/0307201 A1 | 10/2016 | Turgeman |
| 2016/0321445 A1 | 11/2016 | Turgeman |
| 2016/0321689 A1 | 11/2016 | Turgeman |
| 2016/0328572 A1 | 11/2016 | Valacich |
| 2016/0342826 A1 | 11/2016 | Apostolos |
| 2016/0344783 A1 | 11/2016 | Kushimoto |
| 2016/0364138 A1 | 12/2016 | Luo |
| 2016/0366177 A1 | 12/2016 | Turgeman |
| 2016/0371476 A1 | 12/2016 | Turgeman |
| 2017/0011217 A1 | 1/2017 | Turgeman |
| 2017/0012988 A1 | 1/2017 | Turgeman |
| 2017/0017781 A1 | 1/2017 | Turgeman |
| 2017/0032114 A1 | 2/2017 | Turgeman |
| 2017/0034210 A1 | 2/2017 | Talmor |
| 2017/0048272 A1 | 2/2017 | Yamamura |
| 2017/0054702 A1 | 2/2017 | Turgeman |
| 2017/0076089 A1 | 3/2017 | Turgeman |
| 2017/0085587 A1 | 3/2017 | Turgeman |
| 2017/0090418 A1 | 3/2017 | Tsang |
| 2017/0091450 A1 | 3/2017 | Turgeman |
| 2017/0126735 A1 | 5/2017 | Turgeman |
| 2017/0140279 A1 | 5/2017 | Turgeman |
| 2017/0149958 A1 | 5/2017 | Xian |
| 2017/0154366 A1 | 6/2017 | Turgeman |
| 2017/0193526 A1 | 7/2017 | Turgeman |
| 2017/0195354 A1 | 7/2017 | Kesin |
| 2017/0195356 A1 | 7/2017 | Turgeman |
| 2017/0221064 A1 | 8/2017 | Turgeman |
| 2017/0302340 A1 | 10/2017 | Berlin |
| 2017/0364919 A1 | 12/2017 | Ranganath |
| 2018/0012003 A1 | 1/2018 | Asulin |
| 2018/0012227 A1 | 1/2018 | Tunnell |
| 2018/0034850 A1 | 2/2018 | Turgeman |
| 2018/0095596 A1 | 4/2018 | Turgeman |
| 2018/0103047 A1 | 4/2018 | Turgeman |
| 2018/0107836 A1 | 4/2018 | Boger |
| 2018/0115899 A1 | 4/2018 | Kedem |

(56) References Cited

U.S. PATENT DOCUMENTS

| | | | |
|---|---|---|---|
| 2018/0121640 | A1 | 5/2018 | Turgeman |
| 2018/0160309 | A1 | 6/2018 | Turgeman |
| 2018/0314816 | A1 | 11/2018 | Turgeman |
| 2018/0349583 | A1 | 12/2018 | Turgeman |
| 2018/0350144 | A1 | 12/2018 | Rathod |
| 2018/0351959 | A1 | 12/2018 | Turgeman |
| 2019/0028497 | A1 | 1/2019 | Karabchevsky |
| 2019/0057200 | A1 | 2/2019 | Sabag |
| 2019/0121956 | A1 | 4/2019 | Turgeman |
| 2019/0156034 | A1 | 5/2019 | Kedem |
| 2019/0158535 | A1 | 5/2019 | Kedem |
| 2019/0220863 | A1 | 7/2019 | Novick |
| 2019/0272025 | A1 | 9/2019 | Turgeman |

FOREIGN PATENT DOCUMENTS

| | | |
|---|---|---|
| EP | 2610776 A2 | 7/2013 |
| EP | 2646904 B1 | 8/2018 |
| EP | 3019991 B1 | 2/2019 |
| ES | 2338092 A1 | 5/2010 |
| WO | 2005099166 A2 | 10/2005 |
| WO | 2007146437 A2 | 12/2007 |
| WO | 2012073233 A1 | 6/2012 |

OTHER PUBLICATIONS

Written Opinion of the International Searching Authority for PCT international application PCT/IL2018/051246, dated Mar. 11, 2019.
Written Opinion of the International Searching Authority for PCT international application PCT/IL2011/000907, dated Apr. 19, 2012.
Written Opinion of the International Searching Authority for PCT international application PCT/IB2014/062293, dated Oct. 1, 2014.
Written Opinion of the International Searching Authority for PCT international application PCT/IB2014/062941, dated Dec. 17, 2014.
Written Opinion of the International Searching Authority for PCT international application PCT/IB2016/054064, dated Jul. 9, 2015.
Syed Ahsan Abbas et al., "What is the difference between a rooted and unrooted Android?" Quora.com, dated Jul. 22, 2016, printed on Aug. 12, 2019 from www.Quora.com/What-is-the-difference-between-a-rooted-and-unrooted-Android.
Sebastian Lindstrom, "Getting to know asynchronous JavaScript: Callbacks, Promises and Async / Await", Medium.com, dated Jul. 2, 2017, printed on Aug. 12, 2019 from: Medium.com/codebuddies/getting-to-know-asynchronous-javascript-callbacks-promises-and-async-await-17e0673281ee.
Faisal Alkhateeb et al., "Bank Web Sites Phishing Detection and Notification System Based on Semantic Web technologies", International Journal of Security and its Applications 6(4):53-66, Oct. 2012.
Sungzoon Cho et al., "Artificial Rhythms and Cues for Keystroke Dynamics Based Authentication", International Conference on Biometrics (ICB)—Advances in Biometrics, pp. 626-632, year 2006.
International Search Report for PCT/IB2017/055995, dated Feb. 15, 2018.
Written Opinion of the International Search Authority for PCT/IB2017/055995, dated Feb. 15, 2018.
Supplementary European Search Report for application 11844440 dated Nov. 17, 2017.
International Search Report for application PCT/IB2016/054064 dated Nov. 21, 2016.
International Search Report for application PCT/IB2014/062941 dated Dec. 17, 2014.
International Search Report for application PCT/IB2014/062293 dated Oct. 1, 2014.
International Search Report for application PCT/IL2011/000907 dated Apr. 19, 2012.
Nakkabi et al., "Improving Mouse Dynamics Biometric Performance Using Variance Reduction via Extractors with Separate Features", Nov. 2010, IEEE Transactions on System, Man, and Cybernetics; vol. 40, No. 6.
Nance et al., "Virtual Machine Introspection", IEEE Security & Privacy, 2008.
Garfinkel and Rosenblum, "A virtual Machine Introspection-Based Architecture for Intrusion Detection ", 2003, Proc. Network and Distributed Systems Security Symp , The Internet Society, pp. 191-206.
Spafford et al., "Software Forensics: Can We Track Code to its Authors?", Feb. 1992, Computer Science Technical Report, Purdue e-Pubs, Report No. CSD-TR-92-010.
Tavis Ormandy, "An Empirical Study into the Security Exposure to Hosts of Hostile Virtualized Environments", retrieved from the Internet on May 3, 2017, from: http://taviso.decsystem.org/virtsec.pdf.
Zheng et al., "An Efficient User Verification System via Mouse Movements", Oct. 17-21, 2011, CCS'11, Chicago, Illinois.
Liston et al., "On the Cutting Edge: Thwarting Virtual Machine Detection" retrieved from the Internet on May 3, 2017, from http://docplayer.net/9791309-On-the-cutting-edge-thwarting-virtual-machine-detection.html.
Georgia Frantzeskou et al., "Identifying Authorship by Byte-Level N-Grams: The source Code Author Profile (SCAP) Method", Spring 2007, International Journal of Digital Evidence, vol. 6, issue 1.
Franklin et al., "Remote Detection of Virtual Machine Monitors with Fuzzy benchmarking", ACM SIGOPS Operating Systems Review, V42, Issue 3, Apr. 2008.
Emmanouil Vasilomanolakis, "A honeypot-driven cyber incident monitor: Lessons learned and steps ahead" Sep. 2015; SIN '15: Proceedings of the 8th International Conference on Security of Information and Networks; Publisher: ACM; pp. 1-7.
Ahmed et al., "A New Biometric Technology Based on Mouse Dynamics", Jul.-Sep. 2007, IEEE Transactions on Dependable and Secure Computing, vol. 4, No. 3, pp. 165-179.
Bailey, Kyle O., "Computer Based Behavioral Biometric Authentication Via Multi-Modal Fusion", Thesis, 2013, Air Force Insitute of Technology.
Elizabeth Stinson and John C. Mitchell, "Characterizing the Remote Control Behavior of Bots", Detection of Intrusions and Malware, and Vulnerability Assessment. Springer Berlin Heidelberg, p. 89-108. Dec. 31, 2007.
Todorov, "Optimality Principles in Sensorimotor Control (Review)", Sep. 2004, Nature Neuroscience 7, pp. 907-915.
Cleeff et al., "Security Implications of Virtualization: A Literature Study", Science and Engineering, 2009.
Hibbeln et al., "Detecting Deception in Online Environments: Measuring Fraud Through Mouse Cursor Movements", Jun. 7, 2014, Gmunden Retreat on NeuroIS 2014 Gmunden Austria, p. 38.
Ferrie Peter, "Attack on Virtual Machine Emulators", Symantec Technology Exchange, 2007.
Yampolskiy et al., "Behavioural Biometrics: a survey and classification", 2008, International Journal of Biometrics, vol. 1, No. 1, pp. 81-113.
Provos et al., 2007, "The Ghost in the Browser: Analysis of Web-based Malware".
Huang Yao-Wen et al., "Web application security assessment by fault injection and behavior monitoring", 2003, Proceedings of the 12th international conference on World Wide Web, ACM.
Ben Hansen, "The Blur Busters Mouse Guide", dated Feb. 1, 2014 printed from the Internet on Aug. 5, 2019 from https://www.blurbusters.com/faq/mouse-guide/.
Chris Cain, "Analyzing Man-in-the-Browser (MITB) Attacks", dated Dec. 2014 downloaded from the Internet on Aug. 5, 2019 from https://www.sans.org/reading-room/whitepapers/forensics/analyzing-man-in-the-browser-mitb-attacks-35687.

SYSTEM, APPARATUS, AND METHOD OF COLLECTING AND PROCESSING DATA IN ELECTRONIC DEVICES

CROSS-REFERENCE TO RELATED APPLICATIONS

This patent application is a Continuation of U.S. Ser. No. 15/691,770, filed on Aug. 31, 2017, which is hereby incorporated by reference in its entirety; which claims benefit and priority from U.S. 62/546,353, filed on Aug. 16, 2017, which is hereby incorporated by reference in its entirety.

This patent application is also a Continuation-in-Part (CIP) of U.S. Ser. No. 15/847,946, filed on Dec. 20, 2017, which is hereby incorporated by reference in its entirety.

The above-mentioned U.S. Ser. No. 15/847,946 is a Continuation-In-Part (CIP) of U.S. Ser. No. 14/675,764, which is hereby incorporated by reference in its entirety.

The above-mentioned U.S. Ser. No. 14/675,764 claims benefit and priority from U.S. 61/973,855, which is hereby incorporated by reference in its entirety.

The above-mentioned U.S. Ser. No. 14/675,764 is a Continuation-in-Part (CIP) of U.S. Ser. No. 14/566,723, now U.S. Pat. No. 9,071,969, which is hereby incorporated by reference in its entirety; which is a Continuation of U.S. Ser. No. 13/922,271, now U.S. Pat. No. 8,938,787, which is hereby incorporated by reference in its entirety; which is a Continuation-in-Part (CIP) of U.S. Ser. No. 13/877,676, now U.S. Pat. No. 9,069,942, which is hereby incorporated by reference in its entirety; which is a National Stage of PCT/IL2011/000907, which is hereby incorporated by reference in its entirety; which claims priority and benefit from U.S. 61/417,479, which is hereby incorporated by reference in its entirety.

The above-mentioned U.S. Ser. No. 14/675,764 is a Continuation-in-Part (CIP) of U.S. Ser. No. 14/320,653, now U.S. Pat. No. 9,275,337, which is hereby incorporated by reference in its entirety; which claims priority and benefit from U.S. 61/843,915, which is hereby incorporated by reference in its entirety.

The above-mentioned U.S. Ser. No. 14/675,764 is a Continuation-in-Part (CIP) of U.S. Ser. No. 14/320,656, now U.S. Pat. No. 9,665,703, which is hereby incorporated by reference in its entirety; which claims priority and benefit from U.S. 61/843,915, which is hereby incorporated by reference in its entirety.

The above-mentioned U.S. Ser. No. 14/675,764 is a Continuation-in-Part (CIP) of U.S. Ser. No. 14/325,393, now U.S. Pat. No. 9,531,733, which is hereby incorporated by reference in its entirety; which claims priority and benefit from U.S. 61/843,915, which is hereby incorporated by reference in its entirety.

The above-mentioned U.S. Ser. No. 14/675,764 is a Continuation-in-Part (CIP) of U.S. Ser. No. 14/325,394, now U.S. Pat. No. 9,547,766, which is hereby incorporated by reference in its entirety; which claims priority and benefit from U.S. 61/843,915, which is hereby incorporated by reference in its entirety.

The above-mentioned U.S. Ser. No. 14/675,764 is also a Continuation-in-Part (CIP) of U.S. Ser. No. 14/325,395, now U.S. Pat. No. 9,621,567, which is hereby incorporated by reference in its entirety; which claims priority and benefit from U.S. 61/843,915, which is hereby incorporated by reference in its entirety.

The above-mentioned U.S. Ser. No. 14/675,764 is also a Continuation-in-Part (CIP) of U.S. Ser. No. 14/325,396, which is hereby incorporated by reference in its entirety; which claims priority and benefit from U.S. 61/843,915, which is hereby incorporated by reference in its entirety.

The above-mentioned U.S. Ser. No. 14/675,764 is a Continuation-in-Part (CIP) of U.S. Ser. No. 14/325,397, now U.S. Pat. No. 9,450,971, which is hereby incorporated by reference in its entirety; which claims priority and benefit from U.S. 61/843,915, which is hereby incorporated by reference in its entirety.

The above-mentioned U.S. Ser. No. 14/675,764 is a Continuation-in-Part (CIP) of U.S. Ser. No. 14/325,398, now U.S. Pat. No. 9,477,826, which is hereby incorporated by reference in its entirety; which claims priority and benefit from U.S. 61/843,915, which is hereby incorporated by reference in its entirety.

FIELD OF THE INVENTION

The present invention relates to the field of electronic devices.

BACKGROUND

Millions of people worldwide utilize various electronic devices, for example, smartphones, tablets, laptop computers, gaming devices, or the like. Some electronic devices are equipped with a touch-screen, which operates as a combined output unit and input unit: it displays text and graphics as output, and it senses touch gestures of the human user as input.

Electronic devices are utilized on a daily basis for various purposes; for example, to read or consume online content, to send and receive electronic mail (email) messages, to engage in a video conference, to engage in Instant Messaging (IM), to play games, to browse the World Wide Web, to engage with a dedicated "app" or mobile application of a particular service provider, and/or for other purposes.

SUMMARY

The present invention may include, for example, devices, systems, and methods that sense, collect, monitor and/or analyze data in an electronic device. For example, a sensors data collector collects measurements from at least an accelerometer and a gyroscope of an electronic device. A data-loss prevention module operates to pass these measurements, immediately upon their collection, to a supplemental locally-running processing thread which retains the measurements even after a refresh of a web-page in which the measurements were collected, and which transmits the measurements to a remote server even after refresh of the web-page in which the measurements were collected. Non-global scope of functions is utilized, to reduce security exposure. An asynchronous SharedWorker module is utilized, to alleviate congestion of computing resources of the electronic device and/or to alleviate congestion of the resources of the web-page or application or "app". Data obfuscation and encoding is utilized to maintain anonymity of user-entered data while still allowing a remote server to ensure the integrity of data received from the electronic device. A defensive module, implemented as SDK or API, may be efficiently and selectively activated and de-activated, based on whether or not each web-page of a monitored application requires fraud protection, and/or based on whether or not each web-pate of the monitored application typically provides measurements that are useful in detecting possible fraud.

The present invention may provide other and/or additional benefits or advantages.

DETAILED DESCRIPTION OF THE INVENTION

The term "electronic device" as used here may comprise, for example, a smartphone, a tablet, a gaming device, a laptop computer, a notebook computer, an electronic device having a touch-screen or a multi-touch screen, an Internet-of-Things (IoT) device, a wireless-connected device, an Internet-connected device, an Augmented Reality (AR) device, a Virtual Reality (VR) device, a wearable device, a smart-watch, an electronic fitness accessory, or the like.

The terms "page" or "web-page" as used herein, may include any suitable component or on-screen element, and may not necessarily be in the form or in the format or in the structure of a traditional browser page or of a web-page that is viewable through a web browser. Rather, discussion herein that relate to a "page" or a "web-page" may include, for example, any suitable UI or GUI element or batch of elements that are displayed or presented to the user, not necessarily via a web-browser, and not necessarily served from a web server; but also, for example, a tab or window or screen that is generated and/or presented and/or displayed by a native application or "app".

Figure 1:
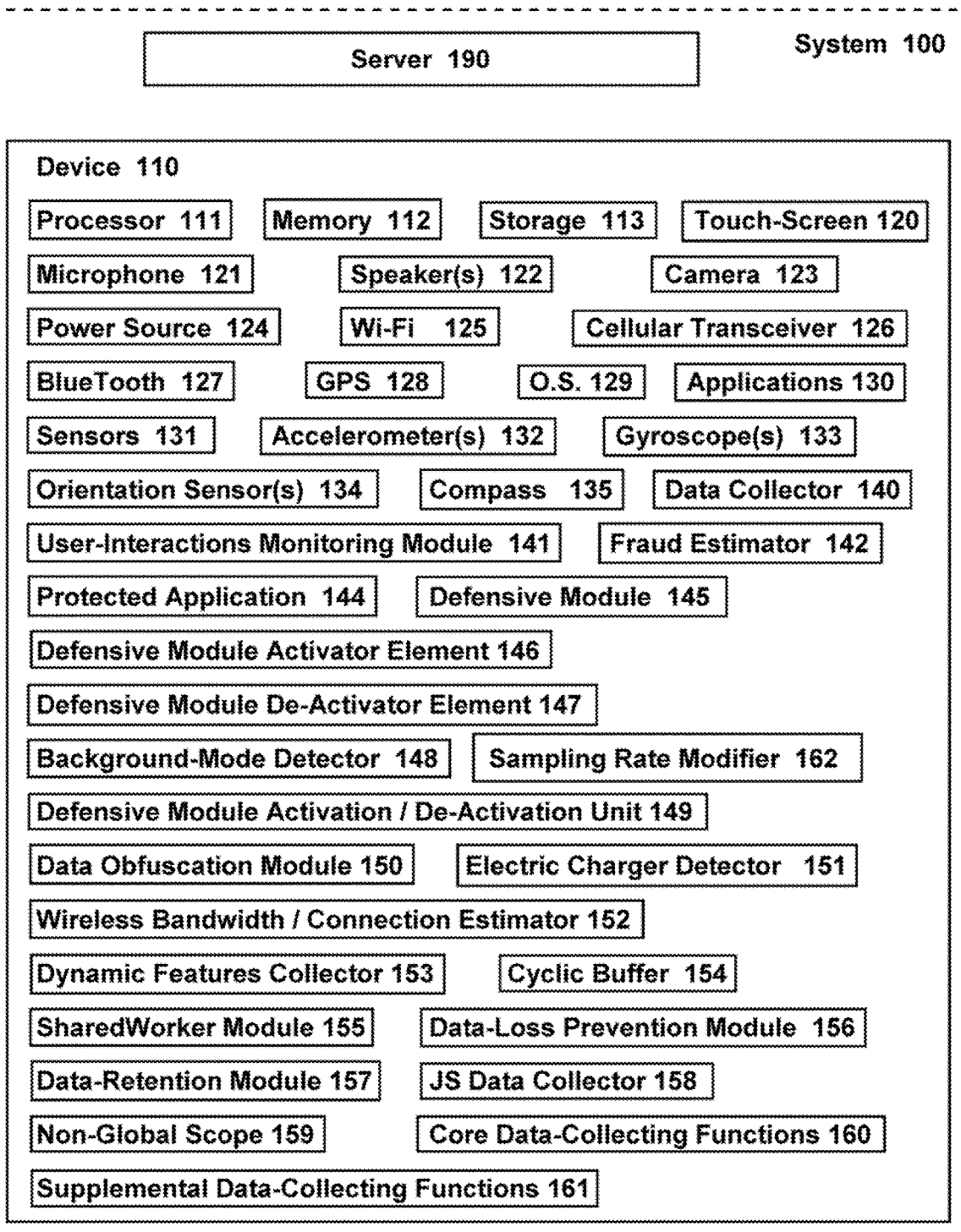
FIG. 1 is a schematic illustration of a system, in accordance with some demonstrative embodiments of the present invention.

Reference is made to FIG. 1, which is a schematic block-diagram illustration of a system 100, in accordance with some demonstrative embodiments of the present invention. System 100 may comprise an electronic device 110, which may be able to communicate over wireless and/or wired communication links with a remote server 190; for example, over the Internet, over TCP/IP link(s) or network(s), over cellular communication link(s) or network(s), over Wi-Fi or Wi-Max or other wireless communication networks, or the like.

Device 110 may comprise, for example, a processor 111 able to execute code and programs and able to process data; a memory unit 112 able to store data (e.g., RAM memory, Flash memory, or the like); a storage unit 113 able to store data (e.g., an SD memory card); a touch-screen 120 able to display output (e.g., text, graphics, images, photographs, video) and able to receive user input (e.g., on-screen tap or double-tap, on-screen touch, on-screen force-sensitive touch or force-touch, on-screen multi-touch with two or more fingers or with a palm of the hand, on-screen pinching or widening gesture to zoom-in or to zoom-out, or the like); a microphone 121 to capture audio; one or more speaker(s) 122 to output audio; a camera 123 to capture photographs and/or video; a power source 124 (e.g., rechargeable battery) to provide power to other components of the device; a Wi-Fi transceiver (802.11 transceiver) 125; an optional cellular transceiver 126; an optional BlueTooth transceiver 127; a Global Positioning System (GPS) unit or module 128; an Operating System (OS) 129 (e.g., Android, iOS, Windows); one or more applications 130 (or "apps"); and/or other suitable components, hardware units and/or software units.

Device 110 may further comprise various sensors 131; for example, one or more accelerometer(s) 132, one or more gyroscope(s) 133, one or more device-orientation sensor(s) 134 (e.g., able to determine an orientation or tilting or angle or slanting of the device relative to the ground), one or more compass unit(s) 135, and/or other suitable types of sensors.

A data-collector module or unit 140 may operate to continuously and/or periodically collect data from one or more of such sensors of the device 110 and/or from one or more input units of the device 110. The collected data (or portions thereof) may be stored locally in device 110, and/or may be transferred or transmitted to remote server 190, and/or may be processed or analyzed locally in device 110, and/or may be processed remotely by remote server 190.

The collected data may be utilized in order to improve the security and/or integrity of a protected application 144, and/or in order to detect, prevent, stop and/or mitigate fraud in a computerized system or service. For example, the protected application 144 may be a mobile "app" or application, implemented as a stand-alone "app" or a native application or as an in-browser application or as a browser-based application. For example, the protected application may be an "app" or a web-page or a web-site or a set of web-pages, that are served and/or operated by an online retailer, an online vendor or merchant, a bank, a banking institution, a financial institution, a securities trading platform, or the like.

For example, the collected data may be analyzed by one or more fraud-detection or fraud-estimation units or modules, which may detect or estimate that a fraudulent transaction or operation are being performed or are attempted, or which may detect or estimate that transactions or operations are more-probably performed (or attempted) by an illegitimate user or by a hacker or a cyber-attacker or by a "bot" or machine or non-human user or automated script, rather than by the legitimate, genuine, human user (e.g., the real owner of the bank account).

In a first example, the data collector 140 may comprise, or may operate in conjunction with, a user-interactions monitoring module 142, which may monitor, track and/or log the user-interactions and user-gestures performed via the touch-screen of the device 110 and/or performed via other input units of the device 110. A fraud estimator unit or module 142 may analyze the tracked user interactions, optionally in relation to (or together with) operations and/or commands and/or data that the device 110 processes or transmits to server 190, and may detect an anomaly or irregularity or mismatch which in turn may trigger a fraud or possible-fraud estimation or determination. For example, user Adam may type the word "Bob" into the field of "name of beneficiary for wire transfer", in a form of an online-banking protected application; but a malware may replace the actually typed name "Bob", with fraudulent information such as a fraudulent recipient "Janet". The user-interactions monitoring module 142 may monitor touch-gestures and taps on the touch-screen, and may detect that the user Adam has inputted three characters into the "wire transfer beneficiary name" field (for "Bob"); and thus, device 110 may send a signal to server 190, indicating to server 190 that the beneficiary name should include three characters; however, the beneficiary name as replaced by the malware and as received by the server 190 includes five characters ("Janet"); and such mismatch may trigger an estimation or determination that fraud is performed or is attempted.

In a second example, device 110 may be sitting on the table, idle and un-touched by its user Adam. However, a malware module exists in device 110, and it sends out data to server 190 indicating a command to wire funds from Adam's bank account to Janet's bank account, posing to be the legitimate user Adam. The data collector 140 continuously collects sensed data from accelerometer(s), gyroscope(s), device-orientation sensors, touch-screen, and/or other units of device 110. Fraud estimator 142 may analyze the sensed and collected data; and may detect that during the time-period in which the Wire Transfer command was allegedly entered and/or transmitted, as well as in the most-recent K seconds before it (e.g., during the 5 or 10 or 15 seconds before it), the device 110 was entirely non-moving and was not moved or touched. The fraud estimator 142 may thus determine or estimate, that it is impossible for a human to type or enter data into multiple fields via device 110, without the device being moved at all; and therefore, the data was not entered by the legitimate human user, but rather, the data was most-probably or more-probably entered or provided by a non-human malware module, or by a remote attacker (e.g., a human cyber-attacker that took control over the device 110 via a Remote Access Trojan (RAT) and operates it remotely).

Various other methods may be used, in order to perform behavioral analysis or biometric analysis of the interactions of the user with device 110, and/or in order to provide fraud protection to device 110 and/or to system 190. Such methods, which may include the data sensing, the data collecting, the data analysis, and the fraud estimation, may be referred to as "Defensive Security Processes", and may be implemented by a set of modules or units which may be referred to as Defensive Module 145.

Applicants have realized that the continuous sensing and collection of such data, may pose a burden on the resources of the device 110; for example, may over-burden the processor of device 110, may consume a significant amount of power from the battery or power-cell of device 110, may over-burden or over-occupy the communication link utilized by the device 110 (e.g., cellular connection, Wi-Fi connection), or the like.

The Applicants have realized that a main purpose of such Defensive Module is to collect behavioral data on the protected application; however, collecting data in a mobile application and/or in a mobile device, may introduce various issues, for example: (a) The data collection should not affect the performance of the application and the user experience; (b) Sensor data collection on mobile devices is extremely power-consuming; (c) when collecting data, a lot of traffic may pass over the network, and the data that is transferred is consumed from the user's data plan or data package (data size may be minified, for example, via compression, but compression is CPU-intensive, power-consuming, and may negatively affect the UI performance and responsiveness and the user experience); (d) personal information of the user should be kept personal and confidential, as much as possible.

The protected application 144 may optionally utilize an interface, for example, a Software Development Kit (SDK), a plug-in, an extension, an add-on, an Application Program Interface (API), or other mechanism in order to selectively operate, activate and/or deactivate the data collector 140, the fraud estimator 142, the Defensive Module 145, and/or other units or module that collect or sense data from units of device 110, and/or that process such data for the purpose of detecting or estimating fraud or for the purpose of improving security and/or integrity of device 110 and/or of server 190 and/or of system 100.

In accordance with the present invention, each page or web-page or component of the protected application 144, may selectively and autonomously command the Defensive Module 145 to start, to stop, to pause and/or to resume. Optionally, this may be performed by an efficient mechanism, for example, by including a Defensive Module Activator Element 146 in the relevant web-page(s), such as a one-line JavaScript function or command of "SDK.pause" or "Defense.pause" to trigger a pausing of the defensive module 145 or of the data-collection/data-analysis process; or similarly, by including a Defensive Module De-Activator Element 147 in other web-pages, such as "SDK.resume" or "Defense.resume" to trigger the resuming of the operations of the defensive module 145 data collection/data analysis.

Reference is made to Example 5, which demonstrates code that may be used to implement the selective pause/resume/stop features of the present invention.

For example, the administrator of the protected application 144, may selectively designate in advance which pages or portions of the protected application, should be associated with an activated or operational Defensive Module 145, and which pages or portions should not. For example, a "Contact Us" page or an "About Us" page of the protected application, may be defined as low-risk pages or as pages that are not typically utilized by a cyber-attacker or by a malware in order to commit fraud; and such pages may comprise the Defensive Module De-Activator Element 147 in order to indicate to device 110 to pause or to de-activate the defensive module 145. In contrast, a "Log-In" page or a "Do a Wire Transfer" page of the protected application, may be defined as high-risk pages or as pages that are typically utilized by a cyber-attacker or by a malware in order to commit fraud; and such pages may comprise the Defensive Module Activator Element 146 in order to indicate to device 110 to activate or to resume the defensive module 145.

In some embodiments, the selective pausing/resuming may relate to all the processes or to all the operations that the Defensive Module 145 is capable of performing. In other embodiments, the selective pausing/resuming may relate to only the collecting of data from all the available sensors or sources (e.g., to consume power), but may not relate to the processing of already-collected data. In other embodiments, the selective pausing/resuming may relate to a particular sensor only (e.g., only to the accelerometer), and not affect other sensors. In other embodiments, the selective pausing/resuming may relate to only a particular set of some particular sensors (e.g., only pausing the collection of data from accelerometer and gyroscope), without affecting other sensors or input-units (e.g., without pausing the collection of gesture data and touch data from the touch-screen).

In some embodiments, in order to consume power and/or battery and/or processing resources, a Background-Mode Detector 148 may be included in device 110 and/or may be part of defensive module 145 and/or may be part of the protected application 144 and/or may be otherwise associated with the operation of defensive module 145. The Background-Mode Detector 148 monitors the performance and/or characteristics of device 110 and/or of the protected application 144, and detects that the protected application was minimized to run in the background, or is no longer the in-focus application that the user is able to interact with, or was closed, or was put or reduced into a "background mode". For example, the protected application 144 may be a particular banking application; it used to be fully operational; but the user pressed the Home button, which caused a minimization of the banking application to run in the background (e.g., no longer displaying the UI of the banking application on the touch-screen). In another example, the protected application is a banking application, which is fully operational; but the user leaves his device on the table for several minutes, and the device goes automatically into "locked" mode, in which the screen no longer displays the UI of the banking application, which still runs in the background.

Upon such detection, that the protected application 144 is currently running only in the background, a Defensive Module Activation/De-Activation Unit 149 may be triggered by the Background-Mode Detector 148. In response the Defensive Module Activation/De-Activation Unit 149 pauses or deactivates the Defensive Module 145, or one or more function or processes of the Defensive Module 145 (e.g., data collection from sensors), in order to consume battery and/or processing resources, since the protected application 144 is not the in-focus application and is not currently being actively used by (or being interacted with) the human user of device 110.

In some embodiments in order to further preserve battery and/or processing resources, one or more of the following may be performed: (a) the Defensive Module 145 (such as, the SDK) is initialized, and/or is operable, on a dedicated processing thread that is exclusive only for the Defensive Module 145 and is not shared by other function or programs or modules of device 110; (b) all the sensor-related calculations and processing, are performed on separate, dedicated processing thread(s) and not on the main or general processing thread; (c) tasks that require access to the main or general processing thread, perform a minimal amount of operations on the main processing thread before switching to the dedicated processing thread(s).

In some embodiments in order to further preserve battery and/or processing resources and/or cellular traffic and/or wireless traffic, the data which is continuously-collected from sensors and input units of the device 110, is only periodically transmitted to remote server 110 (e.g., every K seconds, wherein K is for example 1 second or 3 seconds or 5 seconds or 10 seconds); optionally after such data is minified in size (e.g., by local compression).

In some embodiments, data collected from sensors and/or input-units of device 100, may be subject to a data obfuscation process or a data-generalization process or a data annonimizing process, which may convert actual data into replacement data that cannot be (easily, or at all) be tracked back to a particular user and/or be associated with a particular indefinable person. In an example, the user Adam typed the word "Bob" into the field of "Wire Transfer Beneficiary Name"; and the defensive module 145 has monitored and logged such key-entry operations, of the letters "B" and "o" and "b". However, instead of sending to the server 190 an indication that the word "Bob" was typed, a Data Obfuscation Module 150 converts the actually-sensed data into replacement data, based on a pre-defined replacement scheme. For example, in one replacement scheme, any letter of the alphabet is converted to "A"; any digit from 0 to 9 is converted to "3"; and any other (non-digit, non-letter) character is maintained without replacement (e.g., characters such as $, or #, or @, or the like). For example, the string "Bob" is converted into "AAA"; the string "Jane57" is converted into "AAAA33"; and the string "Jack6$" is converted into "AAAA3$". The defensive module 145 sends to the remote server only the replacement string or the replacement data, rather than sending the actually-typed or actually-sensed string or data. Therefore, if the user types "Bob", the device 110 sends to the remote server 190 the string "AAA", to indicate that the name of the beneficiary as actually typed by the user Adam consists of three consecutive letters. The server 190 may detect that the name of the beneficiary that it received from the device 110, was actually "Charles", which is a string of seven letters; thereby indicating a mismatch, namely, a malware module most-probably intervened and replaced the original data (which was three letters) with a fraudulent string of data. The remote server may thus be able to detect that the data that tampered with, by a hacker or a malicious code or malware, without the server actually knowing what the original/actual data was, and without the device 110 having to send or transmit the original/actual data "Bob". The transmission of the replacement string, protects the original data that was actually entered or sensed; and still enables the remote server to detect an anomaly if an intervening hacker or malware tampers with the data.

In some embodiments, an Electric Charger Detector 151 may operate to detect or to determine whether: (i) device 110 is connected to an external power supply (such as, a wall-based charger, or a portable power-bank unit), and the internal battery of device 110 is being recharged and is receiving additional energy from such external power supply; or, (ii) device 110 is not connected to such external power supply, or, device 110 is connected to such external power supply but for some reason the internal battery of device 110 is not being recharged (e.g., the device 110 is physically connected to an external charger, but actual charging does not occur because the wire or cable is faulty, or because the external power supply is not within an electric socket).

In some embodiments, a Wireless Bandwidth/Connection Estimator 152 may operate to detect or to determine or estimate, whether the device 110 is connected to a Wi-Fi wireless communication link, or to a cellular communication link; and/or to determine the Quality of Service (QoS) or bandwidth or through-put that is provided by such communication link (e.g., fast Wi-Fi, slow Wi-Fi, 2G cellular, 3G cellular, 4G cellular, 4G LTE cellular, or the like). In some embodiments, the detection may be based on whether the Wi-Fi transceiver of the device is turned on or turned off; for example, if the Wi Fi transceiver of device 110 is turned off, then the Wireless Bandwidth/Connection Estimator 152 determines that there is currently no Wi-Fi connectivity. Similarly, if the Wi-Fi transceiver is turned on, but no Wi-Fi network is in range, or if the device 110 is not actually connected to any Wi-Fi network, then the Wireless Bandwidth/Connection Estimator 152 determines that there is currently no Wi-Fi connectivity. In other embodiments, detection of such communication links, and/or their efficiency and/or their QoS and/or their bandwidth and/or their actual throughput, may be estimated in other manners; for example, by performing a Ping operation towards a trusted remote server, and/or by uploading a file to (or downloading a file from) a trusted remote server, or the like.

In some embodiments, a Dynamic Features Collector 153 may dynamically turn-on, turn-off, activate, de-activate, modify, pause and/or resume, one or more of the data-collecting processes and/or one or more of the sensors and/or one or more of the data-analyzing processes, based on whether or not the device 110 is being charged and/or based on whether or not the device 110 is connected to Wi-Fi and/or based on the QoS or bandwidth or through-put of the communication link to which the device 110 is currently connected.

In a first example, Dynamic Features Collector 153 may utilize the following set of rules: (1) if the device 110 is currently re-charging its battery, then activate all the available sensors for data collection; (2) if the device 110 is currently not re-charging is battery, then deactivate the accelerometer and utilize only the other sensors for data collection.

In a second example, Dynamic Features Collector 153 may utilize the following set of rules: (1) if the device 110 is currently connected to Wi-Fi, then activate all the available sensors for data collection; (2) if the device 110 is currently not connected to Wi-Fi, then deactivate the gyroscope and utilize only the other sensors for data collection.

In a third example, Dynamic Features Collector 153 may utilize a combined set of rules, that take into account multiple conditions; for example: (1) if the device 110 is currently connected to Wi-Fi, and is also connected to a battery charger, then activate all the available sensors for data collection; (2) if the device 110 is currently not connected to Wi-Fi, and is currently not connected to a battery charger, then deactivate all the sensors; (3) if the device 110 is currently not connected to Wi-Fi, and is currently connected to a battery charger, then activate the accelerometer (for data collection) and de-activate the gyroscope (for data collection); (4) if the device 110 is currently connected to Wi-Fi, and is currently not connected to a battery charger, then de-activate the accelerometer (for data collection) and activate the gyroscope (for data collection). Other suitable set of rules may be used, in order to enable dynamically-modified collection of data from multiple sensors, based on the availability of battery charger, Wi-Fi, cellular network, and/or other resources.

In another example, the following set of rules (or some of them) may be utilized. (1) If the device 110 is currently connected to Wi-Fi, and is also connected to a battery charger (which currently charges the device 110), then all the available sensors of the device 110 (e.g., motion sensors, accelerometers, gyroscopes, location sensors, orientations sensors) will operate, and will sense data at the highest-possible or maximum sampling rate that is available for such sensor(s) or for the device 110. (2) If the device 110 is currently connected to Wi-Fi, and is not connected to a battery charger (which currently charges the device 110), and the internal battery of the device 110 has at least N percent of battery remaining (where N is, for example, 50 or 55 or 60 or 65 or 70 or 75 or 80 or other suitable value), then all the available sensors of the device 110 (e.g., motion sensors, accelerometers, gyroscopes, location sensors, orientations sensors) will operate, and will sense data at the highest-possible or maximum sampling rate that is available for such sensor(s) or for the device 110; whereas, if the battery remaining is between M and N percent (e.g., between 30 and 60 percent of full charge), then reduce the sampling rate from maximum sampling rate to a reduced sampling rate that is reduced by K percent relative to the maximum sampling rate (e.g., whereas K may be 25 or 40 or 50 or 60 or 75 or other suitable value); and further whereas, if the battery remaining is smaller than M percent (e.g., lower than 30 percent of full charge), then turn-off or disable or deactivate all the sensors and/or avoid data collection from all sensors. (3) If the device 110 is currently not connected to Wi-Fi, and is connected to a battery charger, then all the available sensors of the device 110 (e.g., motion sensors, accelerometers, gyroscopes, location sensors, orientations sensors) will operate, and will sense data, but at non-maximal sampling rate, or at a less-than-maximal sampling rate, or at a rate that is K percent lower than their maximal available sampling rate (e.g., whereas K may be 25 or 40 or 50 or 60 or 75 or other suitable value). (4) If the device 110 is currently not connected to Wi-Fi, and is not connected to a battery charger, and has at least N percent of battery remaining, then all the available sensors of the device 110 (e.g., motion sensors, accelerometers, gyroscopes, location sensors, orientations sensors) will operate, and will sense data but at non-maximal sampling rate, or at a less-than-maximal sampling rate, or at a rate that is K percent lower than their maximal available sampling rate (e.g., whereas K may be 25 or 40 or 50 or 60 or 75 or other suitable value). (5) If the device 110 is currently not connected to Wi-Fi, and is not connected to a battery charger, and has less than M percent of battery remaining, then then turn-off or disable or deactivate all the sensors and/or avoid data collection from all sensors.

In some embodiments, a Sampling Rate Modifier unit or module 162 operates to set, modify, increase and/or decrease the sampling rate of one or more of the sensors of device 110, based on one or more rules or sets of rules (e.g., such as the rules demonstrated above), and/or based on a look-up table that dictates pre-defined sampling rate(s) of various sensor(s) based on pre-defined conditions, for example, whether or not the device 110 is currently connected to Wi-Fi; whether or not the device 110 is currently being charged by an external power source; whether or not the device 110 has at least N percent of battery remaining, whether or not the device 110 has an actual or estimated bandwidth or throughput (e.g., via wireless link and/or via cellular link) that is greater than a pre-defined threshold value, whether or not the device 110 has an actual or estimated bandwidth or throughput (e.g., via wireless link and/or via cellular link) that is smaller than a pre-defined threshold value, and/or other suitable conditions or criteria.

In some embodiments, optionally, a cyclic buffer 154 within device 110 may be used to store data that was sensed or measured or collected by the various sensors of device 110; particularly in time periods in which there is no Internet connectivity and/or no Wi-Fi connectivity and/or no cellular connectivity. For example, the device 110 may be offline (not connected to the Internet; not in communication with the remote server 190), and may continue to gather and collect data sensed or measured by the various device sensors. The sensed data may be locally stored within the cyclic buffer 154, such that the newest sensed data over-writes and replaces the oldest sensed data; thereby ensuring that once the device 110 goes online again, and intends to transmit data to the remote server, then the freshest or newest data is stored in the cyclic buffer 154 and is ready to be transmitted, whereas the oldest data was discarded or was over-written by newer data.

In some embodiments, optionally, data that is collected while the device 110 is online (e.g., connected to the Internet, to Wi-Fi and/or to cellular data network), may be stored in a non-cyclic storage within device 110, such that plenty of data may be gathered and then transmitted, and only upon transmission the older data is over-written or deleted or discarded to make room for newer data; whereas, once the defensive module 145 detects that the device 110 is offline, then collected data is routed to be stored only in the cyclic buffer 154, to ensure that massive amounts of data do not over-burden the storage unit of device 110 while there is no wireless connectivity that allows to transmit (and then to discard) such gathered data. Optionally, a Cyclic Buffer/Storage Unit selector module 155 may automatically select where to store the gathered or sensed or measured data, based on whether the device 110 is online or offline, or based on whether the device is connected to Wi-Fi or not, or based on the QoS or bandwidth or through-put of the Internet connection or data connection.

The Applicants have realized that a Defensive Module that is implemented via JavaScript (JS), or via other client-side script or code or scripting language, which operates to monitor user interactions and/or to collect data from sensors of the device, may not be able to "save state" adequately or entirely, or may be exposed to hacking or attacks from the client side on the local device. The Applicants have realized that such implementation may suffer from one or more problems, for example: (1) When a web-page goes down or shuts down or goes away (e.g., the user closed the web-page window or tab; or, the user browsed away from the monitored web-pate to a different page), all the JS objects are also being removed from the web-page and are discarded, and therefore any previous data that was already collected by the JS module but was not yet sent to a remote server is lost; (2) Any JS code that runs on the page is exposed to attacks from a local malware on the client side, for example, by automatic and/or manual injection of other JS code that modifies the data that the JS code collected, before sending such "modified data" to the remote server; (3) Data collection in short pages is problematic by itself, since the web-page is loaded in a short time (e.g., one second), and the web-page is often unloaded or browsed-away in a short time (e.g., the user spends two or three seconds on such short page, before she browses away to a different page); this is especially true in log-in pages (log-on pages, sign-in pages, sign-on pages), and particularly when the browser is re-utilizing one or more already-saved credentials from a previous session (e.g., retaining the Username that the user had already filled-out in a previous session); and since the time spent on the page is short, the JS code does not have time to collect and/or send-out the monitored data, and the data is lost; and this is particularly unfortunate since the "short" page (e.g., the log-in page) is actually an extremely important page from a security point-of-view or from fraud-detection point-of-view; (4) When the JS code is loaded, the browser needs to parse and/or interpret all the code, line by line, and to execute it line by line; thereby causing a delay in page loading time, especially if the size of the JS code is large (e.g., over 40 lines of JS code); and JS code for monitoring, collecting and/or sending user interaction data and/or sensor-measured data may be relatively long, such that it may adversely affect the page performance, the page loading time, the page responsiveness to user, and the user experience; (5) When collecting data via such JS script and sending it to a remote server, a significant volume of traffic (data-packets) may pass over the network; this may be problematic, particularly when the user is utilizing a mobile device (e.g., smartphone or tablet), which has limited resources, limited battery power (which is depleted by excessive Wi-Fi transmissions and/or cellular transmissions), and which causes consumption of data which is often limited in the allowed quota (e.g., the sending of data-packets by the defensive module to the remote server, may consume a significant amount of data from the cellular data-plan to which the user subscribes via his cellular service provide); (6) An attempt to reduce data-plan consumption by minifying the data (e.g., via local compression) prior to its transmission, may cause other disadvantages, for example, it may require high processing resources, which in turn may turn the web-page to become non-responsive or less responsive or "lagging", and/or may further consume the limited battery power due to the processing-intensive compression of such data; (7) An attempt to perform such compression may further negatively affect the actual collection of user-interaction data or sensors data, since the JS thread is occupied in processor-intensive compression operations, instead of monitoring and processing user inter-actions (e.g., mouse events, keyboard events, touch-screen events, or the like).

The Applicants have devised a system that may mitigate and/or eliminate some or all of the above-mentioned problems. For example, the JS code of the Defensive Module may be implemented by using a SharedWorker module 155 or a SharedWorker mechanism, or other Data-Loss Prevention Module 156 or Data-Retention Module 157, e.g., an additional or supplementary JS thread that can continue running (e.g., collecting sensed data and/or monitoring user interactions and/or transmitting data to remote server and/or maintaining state and/or retaining already-collected data and not-yet-sent-out data), even when the page is refreshed or even if the user browses-away from that page. For example, a JS Data Collector 158 may collect such sensors data and/or user-interactions data, and upon collection of each data-item or event-data or each sensed event or each measured data-item, the collected data-item is immediately passed or transferred to the SharedWorker module 155, which retains the data and prevents loss of data even when the monitored page (in which the JS Data Collector 158 runs) is refreshed or is browsed-away or is shut-down or closed; and the Shared-Worker module 155 transfers or sends the collected data to the remote server 190, in pre-defined time intervals (e.g., every K milliseconds, where K is for example 500 or 1,000 or 2,400 or other value), or when a pre-defined size of collected data is reached (e.g., once at least N bytes of data have been collected, such as, N being 400 or 750 or 1300 bytes or other suitable value), or once a pre-defined number of data-items were collected (e.g., at least M1 measurements from the accelerometer, and/or at least M2 measurements from the gyroscope, or the like), or based on other triggering event or condition (e.g., upon detection that the main page was refreshed or browsed-away or shut-down; or upon receiving a signal from the remote server requesting immediate sending-out of all the already-collected data).

In order to avoid injection attacks or other attacks against the JS code, the Defensive Module may be implemented by utilizing, or as, a Non-Global Scope 159 such as to not expose any object on the global scope. Rather, all the JS code of the Defensive Module, and each function thereof, and each function-of-function thereof, is wrapped in a non-global scope which is non-reachable from the global window object, and thus is not exposed or is less exposed to cyber attacks or for fraud attempts by a local malware module and/or by a human hacker. Additionally, all the data processing (e.g., of the measured or monitored or collected data and user-interactions data and sensors data) is conducted in the SharedWorker side, which is not exposed to (and not reachable from) the global scope where a possible malware may be running; thereby protecting the JS code from injection attack or other attacks or malware.

In order to increase page responsiveness and to enhance user experience, the JS code of the Defensive Module is implemented to perform only the minimum required tasks upon its loading; such that only the Core/Critical Data-Collecting Functions 160 are initialized immediately when the page loads (or, concurrently or partially-overlapping in time with the loading of the page); whereas, Supplemental Data-Collecting Functions 161 are subsequently loaded and/or initialized and/or commence to run, only after the entirety of the page (e.g., all HTML, all CSS, all JS code) has been loaded. The JS script of the Supplemental Data-Collecting Functions 161 is asynchronous or is non-synchronous, such that the JS thread is released immediately after initializing the critical data collectors of the Core/Critical Data-Collecting Functions 160 (e.g., which may be synchronous JS functions). The Supplemental Data-Collecting Functions 161 are activated or launched or commenced subsequently, for example, by or based on server-side configuration or based on a signal that indicates that (or based on autonomous detection that) the page has loaded. It is noted that such implementation further assists to retain data (and/or to prevent data-loss) in short-lived pages or in short pages, and/or particularly in log-in pages.

In a demonstrative implementation, the Core/Critical Data-Collecting Functions 160 include, for example: sensing and collection of mouse events (mouse movement, mouse drag, mouse click, mouse-wheel scroll, or the like), and/or sensing and collection of touch-screen events or touch events (e.g., performed on or via a touch-screen or touch-pad), and/or sensing and collection of other events that cause a change in on-screen location of an on-screen pointer (e.g., user pressed Tab or Enter via an on-screen keyboard).

In a demonstrative implementation, the Core/Critical Data-Collecting Functions 160 include, for example, sensing and collection of all, or some, of the following features: (1) ElementEvents—events on elements such as input, select, focus, blur; (2) MouseEvents—all the mouse events that the user performs; (3) KeyboardEvents—all keyboard events performed, keystrokes; (4) ClipBoardEvents—copy, paste, cut events; (5) WindowEvents—window change events such as window resize; (6) TouchEvents—such as touch gestures on a touch-screen of the device.

In some embodiments, the Supplemental Data-Collecting Functions 161 include, for example: sensing and/or collection of device-orientation data, acceleration data, accelerator(s) data, gyroscope(s) data, compass data, device tilt data, device slanting data, device rotation data, or the like.

In some embodiments, the Supplemental Data-Collecting Functions 161 include, for example, sensing and collection of all, or some, of the following features: (1) DoNotTrack observation or indication or flag or preference; (2) main device language; (3) device platform (operating system type and/or version); (4) input device used (mouse, touch-pad, pen, or the like); (5) hardwareConcurrency parameter, indicating the number of processing cores or CPU cores of the device; (6) device network type; (7) device languages list; (8) plug-ins (e.g., browser plug-ins; browser add-ons; browser extensions) that are installed for this browser or this device; (9) user-agent; (10); time zone; (11) flag or indication of private browsing detection or incognito browsing detection; (12) Internet Protocol (IP) address detection; (13) the fonts installed on the device; (14) detection of Virtual Machine (VM) or similar mechanism; (15) device fingerprint by audio; (16) browser detection; (17) display details (e.g., screen size, resolution, color depth, orientation as portrait or landscape); (18) list of loaded scripts; (19) device accelerometer events; (20) device-orientation events; (21) device gyroscope events; (22) device compass events.

Reference is made to Example 1, which is a code portion demonstrating a first page (Code 1—Page A) which is a username/password log-in submission page, in accordance with some demonstrative embodiments of the present invention. Reference is also made to Example 2, which is a code portion demonstrating a second page (Code 2—Page B) which is a post-login welcome page, in accordance with some demonstrative embodiments of the present invention. Example 1 and Example 2, or similar code, may be utilized to implement some of the features of the present invention.

Reference is made to Example 3, which is a code (Code 3—DataCollector.JS) which demonstrates an implementation of JavaScript code that may be utilized to implement some of the features of the present invention.

In some embodiments, a portion of the JS code of the Defensive Module is loaded in the SharedWorker; and therefore, the main JS thread does not need to parse that portion of the JS code. Rather, that portion of the JS code is being passed to the SharedWorker as a "blob", for further or subsequent parsing by the SharedWorker. Since only a minor part of the JS code is executed synchronously, the web-page loading or responsiveness are not delayed and are not negatively affected (or, the negative effect is minimized and may be un-noticed by a human user); and the remaining portion(s) of the JS code of the Defensive Module load subsequently, only when the JS thread is free.

Furthermore, since all the data that is collected, is immediately passed to the SharedWorker module, then the code does not consume or utilize any memory on the main JS thread, and thus does not negatively impact the user experience or the page responsiveness. Rather, the collected data is aggregated, and is optionally minified or compressed (e.g., by utilizing msgpack protocol, or other compression method) in the SharedWorker, thereby ensuring that no processing cycles are wasted in the main JS thread.

Some embodiments of the present invention may provide a mechanism that enables a computer or an electronic device (e.g., a smartphone, a tablet, a smart-watch, or the like), particular such device having a Web Browser, to locally run and/or locally process a work-thread that runs in the background relative to a "main" window, even if such device or browser does not support a Web Worker mechanism.

The Applicants have realized that some browsers, for example, Microsoft Internet Explorer (IE) version 9 or earlier, do not support JavaScript Web Workers or JavaScript "Worker" or JavaScript "SharedWorker"; and a device running such browser(s) cannot locally execute a local/client-side/browser-side worker-thread in the background.

The Applicants have further realized that it is becoming increasingly significant for an electronic device to have the capability to locally-execute a worker thread in the background, in addition to and in parallel to displaying and/or handing a Main window (or tab).

The Applicants have also realized that some legacy devices and/or browsers cannot be readily updated to new versions, due to various limiting reasons; for example, due to lack of continued support, or lack of readily-available updates, or due to the cost associated with manually updating software on numerous devices, or due to organizational policy which may preclude certain updates or that may require continuous usage of a legacy browser or a legacy device.

Some embodiments of the present invention provide a novel "WorkerCommunicator" library or module or unit, comprising or enabling a method to run code (e.g., scripted code) in a "worker" while enabling such code to run seamlessly and smoothly even if the "worker" technology is not supported by the end-user device or its browser.

In accordance with some embodiments, the "main" element (e.g., the non-worker code) and the "worker" side code are not aware of a state that a Worker/SharedWorker is not supported by the browser, and they continue to operate as if it were supported. In order to achieve this, a novel JavaScript object is created and utilized, for example, a "WorkerCommunicator" object, through which (or through its API) all the communication between the "worker" and the "main" side are performed. The WorkerCommunicator object provides an efficient and developer-friendly API, which is even more developer-friendly compared to the native facilities of Worker/SharedWorker.

If the Worker/SharedWorker are not supported by the browser, then the WorkerCommunicator internal port object is replaced by a novel UnsPort object, which simulates communication between two components (the "main" side and the "worker" side), for example, by using a single object port instead of two separate ports.

The code that is intended to be run in the worker side, is loaded directly in the "main" side. This is performed, for example, by embedding all such code inside a function.

If the Worker/SharedWorker are supported by the browser, then the function toString( ) is called to obtain the code as a string, to parse the code into a Blob object, and to load the Blob object in the worker side (e.g., reflected in Line 6 of the code sample "usageSample.js"). Conversely, if the Worker/SharedWorker are not supported by the browser, the function (which stores the code intended for local processing as a Web Worker) is directly executed as a local function that is loaded directly in the "main" side (e.g., reflected in Line 15 of the code sample "usageSample.js").

Since all the code (which is intended to be executed locally in the browser) is loaded by embedding such code using a Blob (e.g., reflected in Line 6 of "usageSample.js"), there is no dependency on a mechanism of "importScripts" for loading files from the server side; and the code can run smoothly on the client-side browser as part of the "main" side.

Although portions of the discussion herein may relate, for demonstrative purposes, to JavaScript and/or to its function(s), these are only non-limiting demonstrative implementations of the present invention; which may be similarly utilized in conjunction with other programming languages, scripts, scripting languages, scripted languages, interpreted languages, compiled languages, Just In Time (JIT) languages, or the like; even if such languages utilize different names to objects or functions that are generally similar to those that are discussed herein.

Reference is made to Example 4, which is a set of code portions which may be utilized to implement some of the features of the present invention; and including particularly the following demonstrative code portions: CrossPort.js; CrossWorker.js; crossWorkerSample.html; CWMap.js; CWSet.js; UnsPort.js; usageSample.js; workerCodeTemplate.js; workerCodeTemplateEmpty.js; WorkerCommunicator.js. Other suitable code portions or functions may be used.

Figure 2:
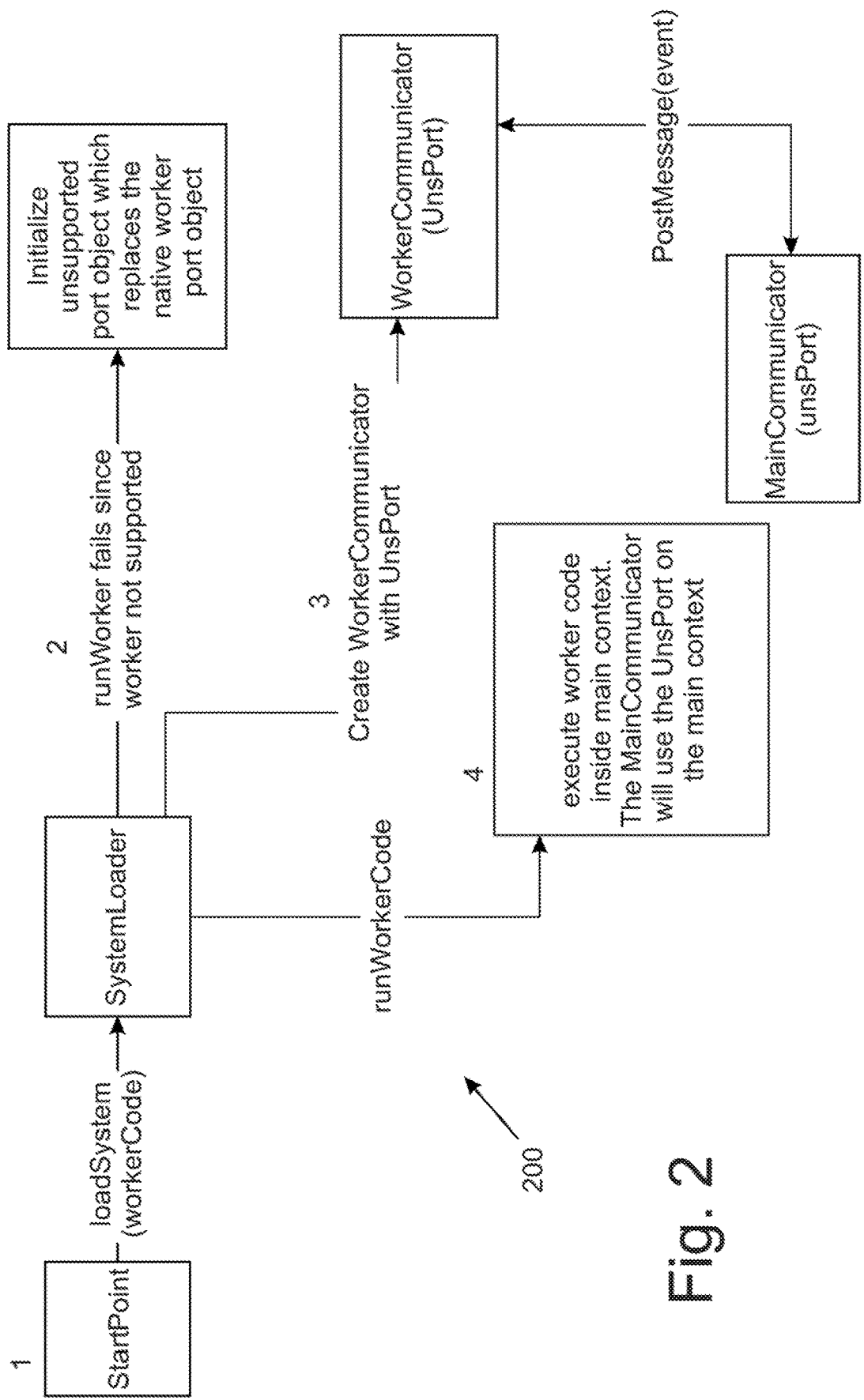
FIG. 2 is a schematic block-diagram illustration of a system, demonstrating an implementation of the present invention.

FIG. 2 is a schematic block-diagram illustration of a system 200, demonstrating an implementation of the present invention.

Figure 3:
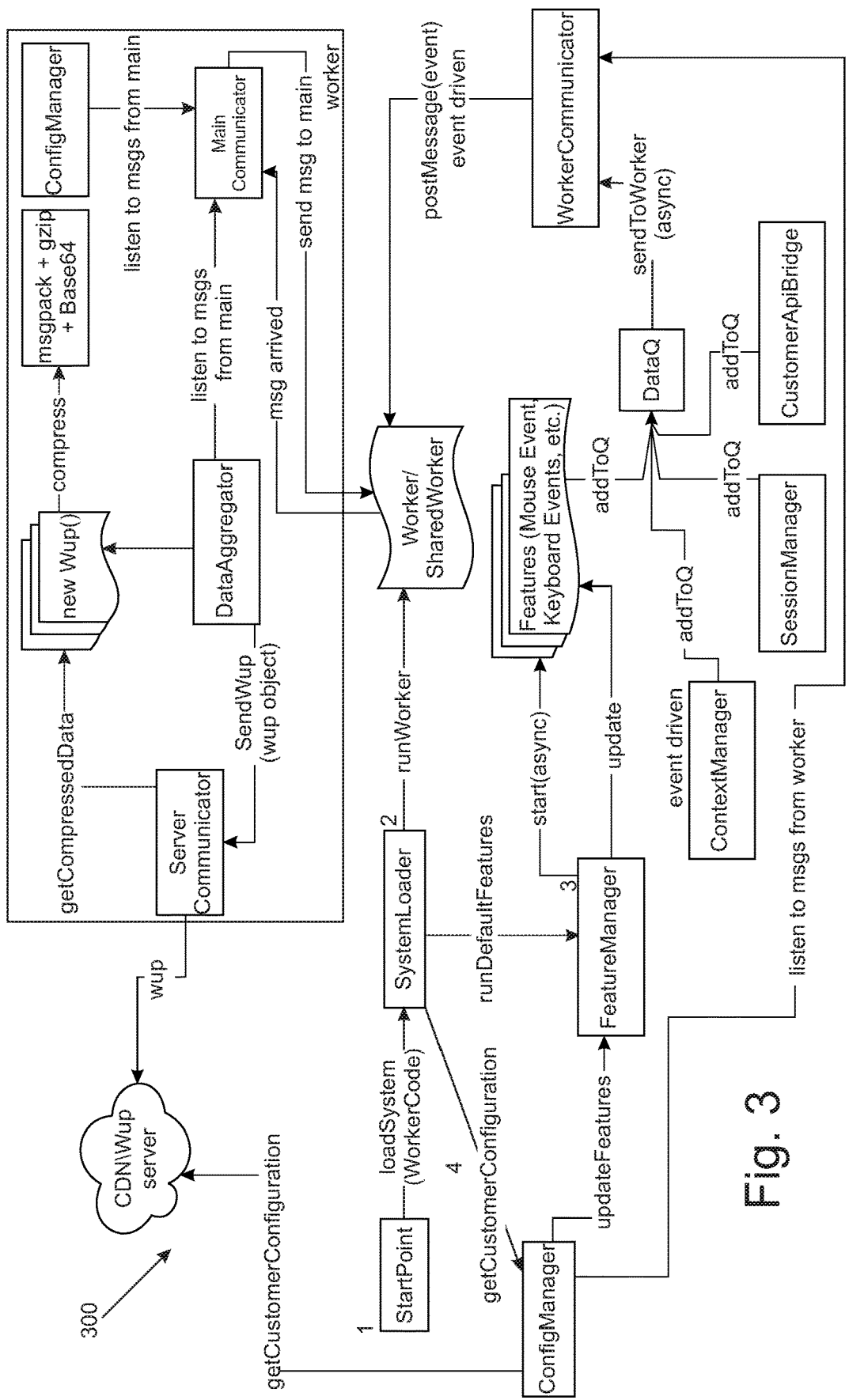
FIG. 3 is a schematic block-diagram illustration of another system, demonstrating an implementation of the present invention.

FIG. 3 is a schematic block-diagram illustration of another system 300, demonstrating an implementation of the present invention.

In some embodiments, the Main part and the Worker part in the regular flow are not aware of the "unsupported" mode. The only object that is changed is the Port object. While in "supported" mode, the port is the native one of the browser. However, in "unsupported" mode, the port is a proprietary object that "mocks" or emulates or simulates or replaces the native port behavior (which does not natively exist in the browser which does not support such feature natively). Accordingly, the WorkerCommunicator, which is based on the port, continues to function as usual even in "unsupported" mode or browser, and therefore all the main-worker communication is working without interruption and without failing.

Embodiments of the present invention need not have "Root Access" to the device on which the Defensive Module operates; and need not be implemented as part of an Operating System or as part of a kernel or a driver; but rather, may be implemented as a user-level application which may be downloaded and installed by a regular, legitimate, post-purchase end-user of the device without "rooting" the device. This may be in direct contrast to some conventional anti-virus or anti-malware modules, which may require Root Access to the device, or which may be installed or added to the device only by the maker of the device, or which may require a risky or illegal or illegitimate or complicated "rooting" of the device by the user.

Embodiments of the invention need not read or access any low-level OS log files, which are typically reserved for OS components and are typically not available to third-party user-level applications (e.g., since OS log files may contain private information of the user). Embodiments of the invention need not access or utilize a READ_LOGS command or module of the OS (or similar log-accessing commands or modules or drivers), and/or do not utilize a parameter value or a constant value such as "android.permission.READ_LOGS" (or similar system-log related parameter or constant or pointer).

Embodiments of the invention may operate particularly in devices running Android OS version 4.1 or later, in which user-level applications (e.g., any application that is not pre-defined as a System App or as part of the OS) do not have access or authorization or permission to read or to inspect OS log files.

Embodiments of the invention may operate regardless of whether the device is already "rooted" or "non-rooted"; and/or regardless of having or not having access to system log files; and/or regardless of the Defensive Module or the Protected Application being a user-level application or a system-level application.

In some embodiments, a system comprises: a sensors data collector, to collect measurements from at least an accelerometer and a gyroscope of an electronic device in which said sensors data collector operates; a data-loss prevention module to pass said measurements, immediately upon collection, to a supplemental locally-running processing thread which (I) retains said measurements even after a refresh of a web-page in which said measurements were collected, and (II) transmits said measurements to a remote server even after said refresh of the web-page in which said measurements were collected.

In some embodiments, an entirety of said sensors data collector, and an entirety of said data-loss prevention module, are implemented by exclusively utilizing non-global functions which are non-accessible from a main JavaScript processing thread.

In some embodiments, the system comprises: a defensive module activation and de-activation unit, (I) to selectively activate a first particular data-collecting function of said defensive module when a battery of said electronic device is being charged by an external power source, and (II) to selectively de-activate a second particular data-collecting function of said defensive module when the battery of said electronic device is not being charged by the external power source.

In some embodiments, the system comprises: a defensive module activation and de-activation unit, (I) to selectively activate a first particular data-collecting function of said defensive module when said electronic device is connected to a Wi-Fi network, and (II) to selectively de-activate a second particular data-collecting function of said defensive module when said electronic device is not connected to a Wi-Fi network.

In some embodiments, the system comprises: a defensive module activation and de-activation unit, (I) to selectively activate a first particular data-collecting function of said defensive module when said electronic device is capable of sending data via a cellular network, and (II) to selectively de-activate a second particular data-collecting function of said defensive module when said electronic device is not capable of sending data via the cellular network.

In some embodiments, the system comprises: a data obfuscation module, (i) to receive a user-entered string that was manually entered by a user via said electronic device, (ii) to generate a replacement string, wherein a length of the user-entered string is identical to a length of the replacement string, by performing at least: (a) replacing each letter in said user-entered string with a first fixed substitute letter, (b) replacing each digit in said user-entered string with a second fixed substitute letter.

In some embodiments, the system comprises: a data obfuscation module, (i) to receive a user-entered string that was manually entered by a user via said electronic device, (ii) to generate a replacement string, wherein a length of the user-entered string is identical to a length of the replacement string, by performing at least: (a) replacing each letter in said user-entered string with a first fixed substitute letter, (b) replacing each digit in said user-entered string with a second fixed substitute letter, (c) maintaining unchanged each non-letter non-digit character; wherein the defensive module is to transmit said replacement string to a remote data-integrity server which determines authenticity of said user-entered string, by comparing between: attributes of the replacement string that is received from the defensive module, and attributes of the user-entered string that is sent by a protected application that runs on said electronic device which is protected by said defensive module.

In some embodiments, the system comprises: a data obfuscation module, (i) to receive a user-entered string that was manually entered by a user via said electronic device, (ii) to generate a replacement string, wherein a length of the user-entered string is identical to a length of the replacement string, by performing at least: (a) replacing each letter in said user-entered string with a first fixed substitute letter, (b) replacing each digit in said user-entered string with a second fixed substitute letter, (c) maintaining unchanged each non-letter non-digit character; wherein the defensive module is to transmit said replacement string to a remote data-integrity server which determines authenticity of said user-entered string, by comparing between: attributes of the replacement string that is received from the defensive module, and attributes of the user-entered string that is sent by a protected application that runs on said electronic device which is protected by said defensive module.

In some embodiments, the defensive module comprises: a main processing thread that collects data and immediately passes each collected data-item to a SharedWorker module; said SharedWorker module, (a) to receive each collected data-item from the main processing thread, and (b) to subsequently process said data locally in a-synchronous manner after completion of loading of a web-page in which the main processing thread is operable, and (c) to subsequently transmit a processed version of said data to a remote server in a-synchronous manner after completion of loading of the web-page in which the main processing thread is operable.

In some embodiments, the system comprises: a background-mode detector, (a) to generate a detection that that a protected application that is associated with said defensive module, was minimized to background-running mode in said electronic device; and (b) upon said detection in step (a), to selectively de-activate a particular data-collecting function of said defensive module.

In some embodiments, the system comprises: a defensive-module de-activation element, which is inserted into a first web-page of a monitored application, to command said defensive module to pause data-collecting operations while said first web-page is visited; a defensive-module re-activation element, which is inserted into a second web-page of said monitored application, to command said defensive module to resume data-collecting operations while said second web-page is visited.

In some embodiments, the system comprises: a defensive-module de-activation element, which is inserted into a first web-page of a monitored application, to command said defensive module to pause data-collecting operations while said first web-page is visited, wherein said first web-page is pre-defined as a web-page that does not generate user interactions that are useful for fraud detection; a defensive-module re-activation element, which is inserted into a second web-page of said monitored application, to command said defensive module to resume data-collecting operations while said second web-page is visited, wherein said second web-page is pre-defined as a web-page that generates user interactions that are useful for fraud detection.

In some embodiments, the system comprises: a defensive-module de-activation element, which is inserted into a first web-page of a monitored application, to command said defensive module to pause data-collecting operations while said first web-page is visited, wherein said first web-page is pre-defined as a web-page that pauses a security risk smaller than a pre-defined threshold; a defensive-module re-activation element, which is inserted into a second web-page of said monitored application, to command said defensive module to resume data-collecting operations while said second web-page is visited, wherein said second web-page is pre-defined as a web-page that pauses a security risk that is equal to or greater than a pre-defined threshold.

In some embodiments, said electronic device is a non-rooted electronic device.

In some embodiments, said defensive module is operable without having root access in said electronic device.

In some embodiments, said defensive module is operable without having access to any system logs of said electronic device.

In some embodiments, defensive module is implemented as an integral component of a monitored application that is protected by said defensive module.

In some embodiments, said defensive module is implemented as an integral component of a monitored application that is protected by said defensive module.

In some embodiments, said defensive module is implemented as an external component which resides in said electronic device and which runs on said electronic device but is a separate application from a monitored application that is protected by said defensive module.

The system(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic sensor(s), optical sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules. The system(s) of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Rust, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may operate in conjunction with, or may utilize, one or more systems, devices and/or methods that operate to detect malware and/or stop malware and/or remove malware; and/or operate to detect or stop or remove a computer virus or a "Trojan" module or a "phishing" attack or other cyber-attack or fraud; and/or operate to distinguish between a human user and a "bot" or automatic script or a malicious automatic script; and/or operate to distinguish between (I) a malicious code or malware and (II) a non-malicious code or non-malicious program; and/or operate in conjunction with a system that utilizes user-specific behavior to distinguish among human users and/or to detect automated users or "bots"; and/or operate to inject or introduce an anomaly or aberration or interference or irregularity into the UI of a website or a web-page or an application or an "app" (e.g., an irregular or abnormal or unexpected on-screen behavior or movement of a cursor or pointer in response to user's interactions with input units), and/or to monitor the user's reaction and/or corrective action(s) to such anomaly or aberration.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A system comprising:
one or more hardware processors configured to execute code, wherein the one or more hardware processors are operably associated with one or more memory units to store code;
wherein the one or more hardware processors are configured to implement:
a sensors data collector, to collect sensed data from at least one sensor selected from a group consisting of: an accelerometer of an electronic device in which said sensors data collector operates, a gyroscope of said electronic device, a spatial orientation sensor of said electronic device, a touch-screen of said electronic device, an on-screen keyboard of said electronic device, a keyboard of said electronic device;
a defensive module, configured to protect against fraud, by utilizing sensed data collected from said at least one sensor of said electronic device, wherein the sensed data comprises at least one of: keystrokes, touch-screen typing;
wherein the defensive module comprises a data obfuscation module, that is configured:
(i) to receive a user-entered string that was manually entered by a user via said electronic device,
(ii) to generate a replacement string, wherein a length of the user-entered string is identical to a length of the replacement string, by performing: (a) replacing each letter in said user-entered string with a first fixed substitute letter, (b) replacing each digit in said user-entered string with a second fixed substitute letter, (c) maintaining unchanged each non-letter non-digit character;
wherein the defensive module is to transmit said replacement string to a remote data-integrity server which determines authenticity of said user-entered string, by comparing between: attributes of the replacement string that is received from the defensive module, and attributes of the user-entered string that is sent by a protected application that runs on said electronic device which is protected by said defensive module.

2. The system of claim 1,
wherein an entirety of said sensors data collector is implemented by exclusively utilizing non-global functions which are non-accessible from a main JavaScript processing thread.

3. The system of claim 1, wherein the one or more hardware processors are further configured to implement:
a defensive module activation and de-activation unit, (I) to selectively activate a first particular data-collecting function of said defensive module when a battery of said electronic device is being charged by an external power source, and (II) to selectively de-activate a second particular data-collecting function of said defensive module when the battery of said electronic device is not being charged by the external power source.

4. The system of claim 1, comprising wherein the one or more hardware processors are further configured to implement:
a defensive module activation and de-activation unit, (I) to selectively activate a first particular data-collecting function of said defensive module when said electronic device is connected to a Wi-Fi network, and (II) to selectively de-activate a second particular data-collecting function of said defensive module when said electronic device is not connected to a Wi-Fi network.

5. The system of claim 1, comprising wherein the one or more hardware processors are further configured to implement:
a defensive module activation and de-activation unit, (I) to selectively activate a first particular data-collecting function of said defensive module when said electronic device is capable of sending data via a cellular network, and (II) to selectively de-activate a second particular data-collecting function of said defensive module when said electronic device is not capable of sending data via the cellular network.

6. The system of claim 1,
wherein said defensive module comprises:
a main processing thread that collects data and immediately passes each collected data-item to a Shared-Worker module;
said SharedWorker module, (a) to receive each collected data-item from the main processing thread, and (b) to subsequently process said data locally in a-synchronous manner after completion of loading of a web-page in which the main processing thread is operable, and (c) to subsequently transmit a processed version of said data to a remote server in a-synchronous manner after completion of loading of the web-page in which the main processing thread is operable.

7. The system of claim 1, wherein the one or more hardware processors are further configured to implement:
a background-mode detector, (a) to generate a detection that that a protected application that is associated with said defensive module, was minimized to background-running mode in said electronic device; and (b) upon said detection in step (a), to selectively de-activate a particular data-collecting function of said defensive module.

8. The system of claim 1, wherein the one or more hardware processors are further configured to implement:
a defensive-module de-activation element, which is inserted into a first web-page of a monitored application, to command said defensive module to pause data-collecting operations while said first web-page is visited;
a defensive-module re-activation element, which is inserted into a second web-page of said monitored application, to command said defensive module to resume data-collecting operations while said second web-page is visited.

9. The system of claim 1, wherein the one or more hardware processors are further configured to implement:
a defensive-module de-activation element, which is inserted into a first web-page of a monitored application, to command said defensive module to pause data-collecting operations while said first web-page is visited, wherein said first web-page is pre-defined as a web-page that does not generate user interactions that are useful for fraud detection;
a defensive-module re-activation element, which is inserted into a second web-page of said monitored application, to command said defensive module to resume data-collecting operations while said second web-page is visited, wherein said second web-page is pre-defined as a web-page that generates user interactions that are useful for fraud detection.

10. The system of claim 1, wherein the one or more hardware processors are further configured to implement:
a defensive-module de-activation element, which is inserted into a first web-page of a monitored application, to command said defensive module to pause data-collecting operations while said first web-page is visited, wherein said first web-page is pre-defined as a web-page that pauses a security risk smaller than a pre-defined threshold;
a defensive-module re-activation element, which is inserted into a second web-page of said monitored application, to command said defensive module to resume data-collecting operations while said second web-page is visited, wherein said second web-page is pre-defined as a web-page that pauses a security risk that is equal to or greater than a pre-defined threshold.

11. The system of claim 1,
wherein said electronic device is a non-rooted electronic device.

12. The system of claim 1,
wherein said defensive module is operable without having root access in said electronic device.

13. The system of claim 1,
wherein said defensive module is operable without having access to any system logs of said electronic device.

14. The system of claim 1,
wherein said defensive module is implemented as an integral component of a monitored application that is protected by said defensive module.

15. The system of claim 1,
wherein said defensive module is implemented as an integral component of a monitored application that is protected by said defensive module.

16. The system of claim 1,
wherein said defensive module is implemented as an external component which resides in said electronic device and which runs on said electronic device but is a separate application from a monitored application that is protected by said defensive module.

17. A method comprising:
at a sensors data collector, collecting sensed data from at least one sensor selected from a group consisting of: an accelerometer of an electronic device in which said sensors data collector operates, a gyroscope of said electronic device, a spatial orientation sensor of said electronic device, a touch-screen of said electronic device, an on-screen keyboard of said electronic device, a keyboard of said electronic device;
at a defensive module, that is configured to protect against fraud by utilizing sensed data collected from said at least one sensor of said electronic device, operating a the defensive module having a data obfuscation module, by performing:
(i) receiving a user-entered string that was manually entered by a user via said electronic device,
(ii) generating a replacement string, wherein a length of the user-entered string is identical to a length of the replacement string, by performing: (a) replacing each letter in said user-entered string with a first fixed substitute letter, (b) replacing each digit in said user-entered string with a second fixed substitute letter, (c) maintaining unchanged each non-letter non-digit character;
transmitting, by the defensive module, said replacement string to a remote data-integrity server which determines authenticity of said user-entered string, by comparing between: attributes of the replacement string that is received from the defensive module, and attributes of the user-entered string that is sent by a protected application that runs on said electronic device which is protected by said defensive module.

18. A non-transitory storage medium have stored thereon instructions that, when executed by a machine, cause the machine to perform a method comprising:
at a sensors data collector, collecting measurements from at least one sensor selected from a group consisting of: an accelerometer of an electronic device in which said sensors data collector operates, a gyroscope of said electronic device, a spatial orientation sensor of said electronic device, a touch-screen of said electronic device, an on-screen keyboard of said electronic device, a keyboard of said electronic device;
at a defensive module, that is configured to protect against fraud by utilizing measurements collected from said at least one sensor of said electronic device, operating a the defensive module having a data obfuscation module, by performing:
(i) receiving a user-entered string that was manually entered by a user via said electronic device,
(ii) generating a replacement string, wherein a length of the user-entered string is identical to a length of the replacement string, by performing: (a) replacing each letter in said user-entered string with a first fixed substitute letter, (b) replacing each digit in said user-entered string with a second fixed substitute letter, (c) maintaining unchanged each non-letter non-digit character;

transmitting, by the defensive module, said replacement string to a remote data-integrity server which determines authenticity of said user-entered string, by comparing between: attributes of the replacement string that is received from the defensive module, and attributes of the user-entered string that is sent by a protected application that runs on said electronic device which is protected by said defensive module.

* * * * *